United States Patent
Baldi et al.

(10) Patent No.: US 11,637,787 B2
(45) Date of Patent: *Apr. 25, 2023

(54) PREVENTING DUPLICATION OF PACKETS IN A NETWORK

(71) Applicant: Cisco Technology, Inc., San Jose, CA (US)

(72) Inventors: Mario Baldi, Brooklyn, NY (US); Murty Kotha, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 16/922,399

(22) Filed: Jul. 7, 2020

(65) Prior Publication Data

US 2020/0336436 A1 Oct. 22, 2020

Related U.S. Application Data

(63) Continuation of application No. 16/058,256, filed on Aug. 8, 2018, now Pat. No. 10,785,164.
(Continued)

(51) Int. Cl.
*H04L 47/70* (2022.01)
*H04L 47/32* (2022.01)
*H04L 45/00* (2022.01)

(52) U.S. Cl.
CPC .............. *H04L 47/70* (2013.01); *H04L 45/70* (2013.01); *H04L 47/32* (2013.01)

(58) Field of Classification Search
CPC .......... H04L 47/70; H04L 45/70; H04L 47/32
See application file for complete search history.

(56) References Cited

U.S. PATENT DOCUMENTS 8,660,994 B2   2/2014   Slater et al.
9,697,224 B1   7/2017   Factor et al.
(Continued)

OTHER PUBLICATIONS

"Unique Capabilities of the Arista and NetApp Product Offering", DS-3132-0211, Arista Networks, Inc. and NetApp, Inc., https://www.arista.com/assets/data/pdf/DS-3132-0211_Arista_JSB_LR.pdf, 2011, 4 pages.
(Continued)

*Primary Examiner* — Siming Liu
(74) *Attorney, Agent, or Firm* — Edell, Shapiro & Finnan, LLC

(57) ABSTRACT

In one example, a collection network node comprising a plurality of ingress ports obtains, at a first one of the plurality of ingress ports, a first copy of a packet of a packet flow comprising a plurality of packets. The collection network node determines whether the collection network node had previously obtained a copy of any of the plurality of packets of the packet flow. When it is determined that the collection network node had previously obtained a copy, the collection network node determines whether the collection network node had previously obtained a copy at the first one of the plurality of ingress ports or at a different one of the plurality of ingress ports. When it is determined that the collection network node had previously obtained a copy at a different one of the plurality of ingress ports, the collection network node refrains from forwarding the first copy.

20 Claims, 30 Drawing Sheets

Related U.S. Application Data

(60) Provisional application No. 62/678,581, filed on May 31, 2018.

(56) References Cited

U.S. PATENT DOCUMENTS

| | | | |
|---|---|---|---|
| 10,785,164 B2* | 9/2020 | Baldi | H04L 47/32 |
| 2016/0013815 A1 | 1/2016 | Wideman et al. | |
| 2016/0162218 A1 | 6/2016 | Callaway et al. | |
| 2019/0199609 A1* | 6/2019 | Hammerle | H04L 43/028 |

OTHER PUBLICATIONS

"Understanding Deduplication in Tap Aggregation (NPB)", Arista EOS Central, https://eos.arista.com/understanding-deduplication-in-tap-aggregation-npb/, Oct. 26, 2015, 18 pages.

"What I Learned at Cisco Live", Focus TSI, https://www.focustsi.com/resource/learned-cisco-live/, Jul. 25, 2016, 3 pages.

"Changing the default deduplication trigger", IBM Tivoli Monitoring, Version 6.3, https://www.ibm.com/support/knowledgecenter/SSTFXA_6.3.0/com.ibm.itm.doc_6.3/install/chng_dedup_trig.htm, downloaded from the Internet on Jun. 6, 2018, 2 pages.

"De-duplication", Gigamon, https://www.gigamon.com/products/intelligent-appliances/traffic-intelligence/gigasmart/de-duplication.html, downloaded from the Internet on Jun. 6, 2018, 6 pages.

"Data Sheet: GigaSMART", https://www.gigamon.com/content/dam/resource-library/english/data-sheet/ds-gigasmart.pdf, 4003-24, Apr. 2018, 7 pages.

* cited by examiner

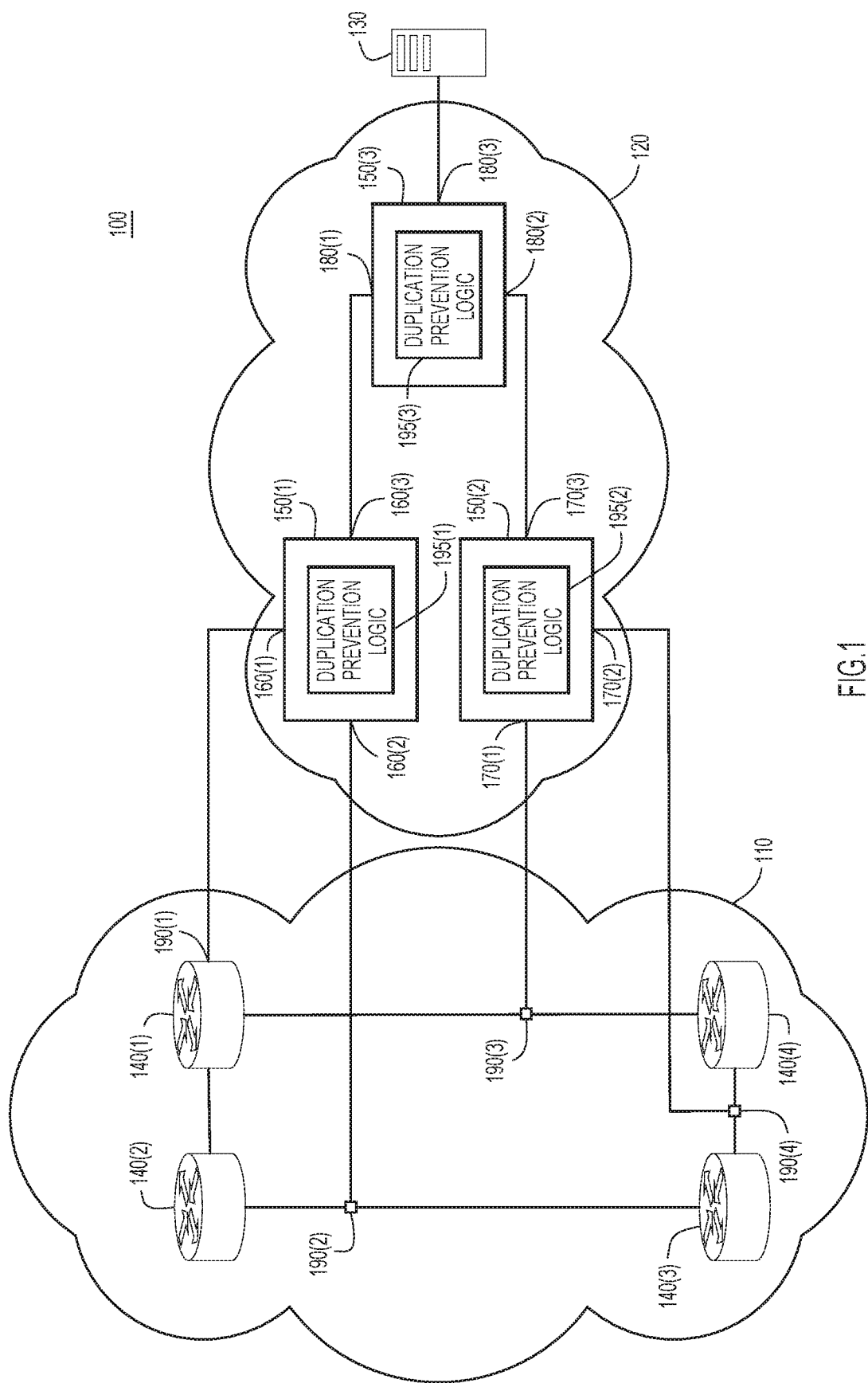

300A

| FLOW ID | FORWARDING PORT | VALID BIT |
|---|---|---|
| A1, A2, T, P1, P2 | 1 | T |
| A1, A3, T, P3, P4 | 2 | F |
| f | i | v |

| FLOW ID | FORWARDING PORT | ACTIVE BIT |
|---|---|---|
| A1, A2, T, P1, P2 | 1 | T |
| A1, A3, T, P3, P4 | 2 | F |
| f | i | a |

| FLOW ID | FORWARDING PORT | ON HOLD BIT |
|---|---|---|
| A1, A2, T, P1, P2 | 1 | T |
| A1, A3, T, P3, P4 | 2 | T |
| f | i | h |

| FLOW ID | FORWARDING PORT | ACTIVE BIT |
|---------|-----------------|------------|
| F1 | 1 | T |
| F2 | 1 | F |
| f | i | a |

| FLOW ID | NON - FORWARDING PORT | COUNT |
|---------|----------------------|-------|
| F1 | 2 | 2 |
| F2 | 3 | 2 |
| F2 | 2 | 1 |
| f | j | c |

FIG.8B

FORWARDING TABLE (FT) 900A — 205, 210, 905

| FLOW ID | FORWARDING PORT | COUNT |
|---|---|---|
| F1 | 1 | 3 |
| F2 | 1 | 4 |
| f | i | a |

FIG.9A

COUNTER TABLE (CT) 900B — 810, 815, 820

| FLOW ID | NON - FORWARDING PORT | COUNT |
|---|---|---|
| F1 | 2 | 2 |
| F2 | 3 | 2 |
| F2 | 2 | 1 |
| f | j | c |

FIG.9B

HASH TABLE (HT) 900C — 910, 915

| FLOW ID | HASH |
|---|---|
| F1 | AF68 |
| F2 | 4ED6 |
| f | h |

FIG.9C

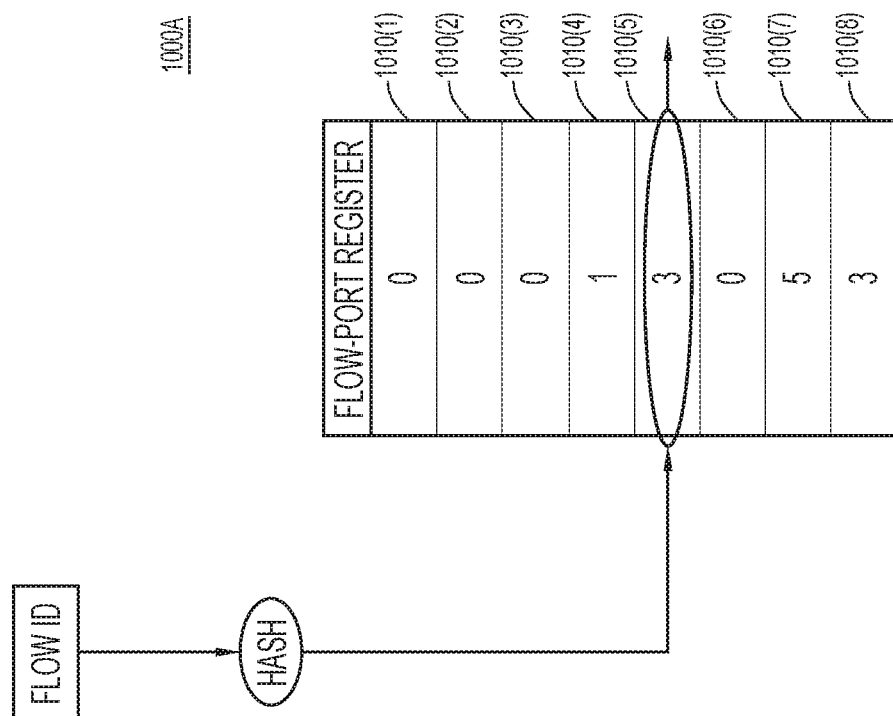

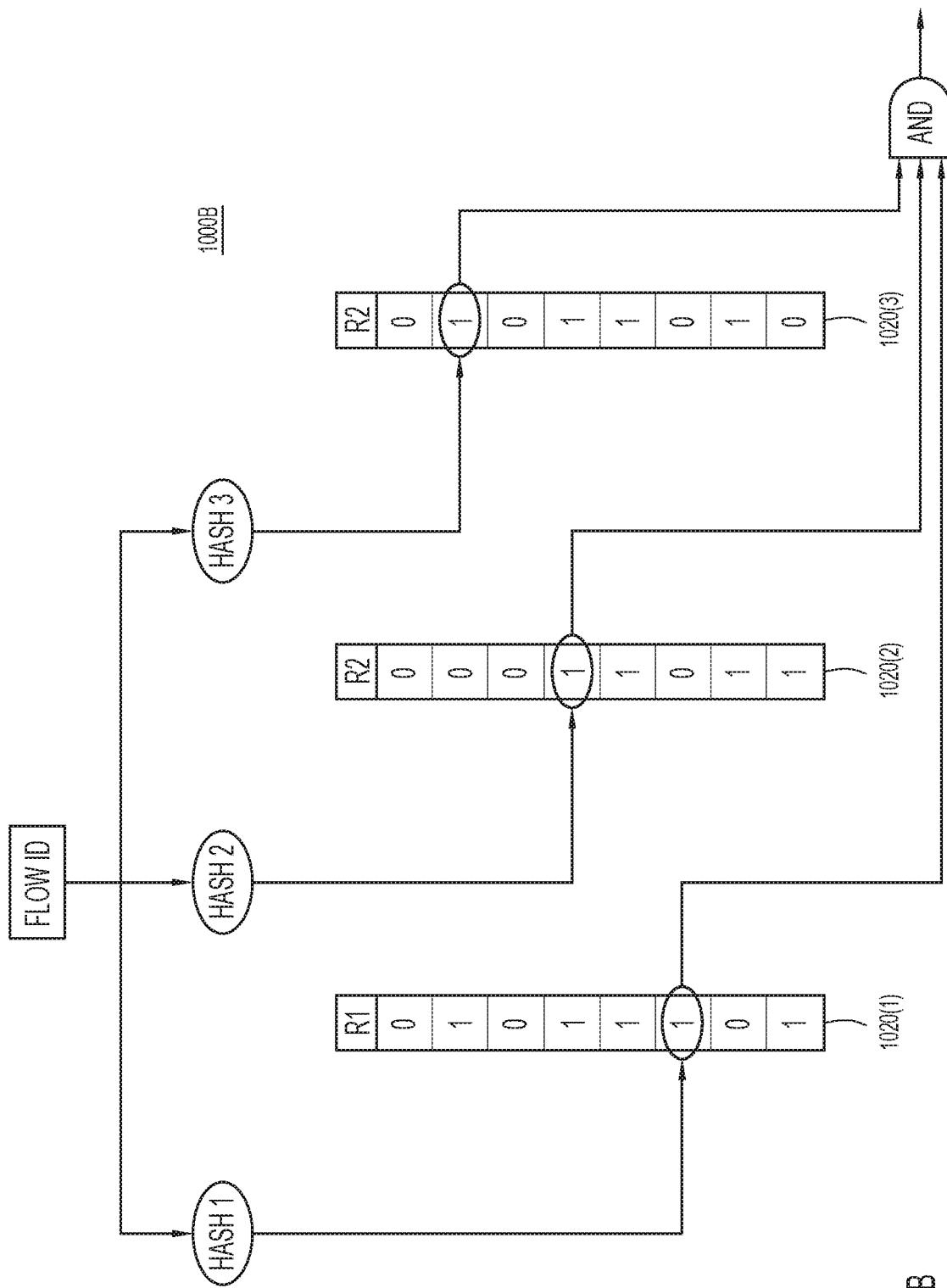

PREVENTING DUPLICATION OF PACKETS IN A NETWORK

CROSS-REFERENCE TO RELATED APPLICATIONS

This application is a continuation of U.S. application Ser. No. 16/058,256, filed Aug. 8, 2018, which in turn claims priority to U.S. Provisional Application No. 62/678,581, filed May 31, 2018. The entirety of each of these applications is incorporated herein by reference.

TECHNICAL FIELD

The present disclosure relates to network packet collection.

BACKGROUND

In the context of network data brokers and packet data brokers, a distributed collection network is comprised of one or more network nodes configured to forward network packets/data units collected in another network (e.g., a production network). Certain network nodes in the collection network, sometimes referred to as "collection network nodes," are connected to devices, such as Test Access Points (TAPs), probes, or production network nodes configured to capture copies of packets from various points in the production network, and forward the captured packets to a collector for storage. Once stored, the captured packets may be analyzed to resolve problems in the production network, ensure the proper enforcement of production network security policies, etc.

There are other contexts in which collection networks are used, such as the Internet of Things (IoT). The IoT is a general term used to describe the addition of networking capabilities to physical objects or "things" that serve some purpose or function outside of solely computing and/or networking technologies. For example, traditionally "unconnected" or "offline" devices include thermometers, refrigerators, lights, wristbands, and sensors. IoT devices perform similar functions, but are also outfitted with network interfaces that enable sending and/or receiving data packets in an IoT network. IoT devices are connected through gateways to a network of brokers that relay information (e.g., measurements) from IoT devices to one or more consumers.

BRIEF DESCRIPTION OF THE DRAWINGS

FIG. 1 illustrates a system configured to prevent duplication of packets in a collection network, according to an example embodiment.

FIG. 3A illustrates a forwarding table in which valid bits are associated with respective forwarding ports of respective flows, according to an example embodiment.

FIG. 5A illustrates a forwarding table in which active bits are associated with respective forwarding ports of respective flows, according to an example embodiment.

FIG. 6A illustrates a forwarding table in which on-hold bits are associated with respective forwarding ports of respective flows, according to an example embodiment.

FIG. 8A illustrates another forwarding table in which active bits are associated with respective forwarding ports of respective flows, according to an example embodiment.

FIG. 8B illustrates a counter table in which counts of packets are associated with respective non-forwarding ports of respective flows, according to an example embodiment.

FIG. 9A illustrates a forwarding table in which counts of packets are associated with respective forwarding ports of respective flows, according to an example embodiment.

FIG. 9B illustrates another counter table in which counts of packets are associated with respective non-forwarding ports of respective flows, according to an example embodiment.

FIG. 9C illustrates a hash table in which hashes of packets are associated with respective flows, according to an example embodiment.

FIG. 10A illustrates a register associating respective forwarding ports with respective flows, according to an example embodiment.

FIG. 10B illustrates a plurality of registers comprising a Bloom filter associated with the register of FIG. 10A, according to an example embodiment.

DESCRIPTION OF EXAMPLE EMBODIMENTS

Overview

Figure 2A:
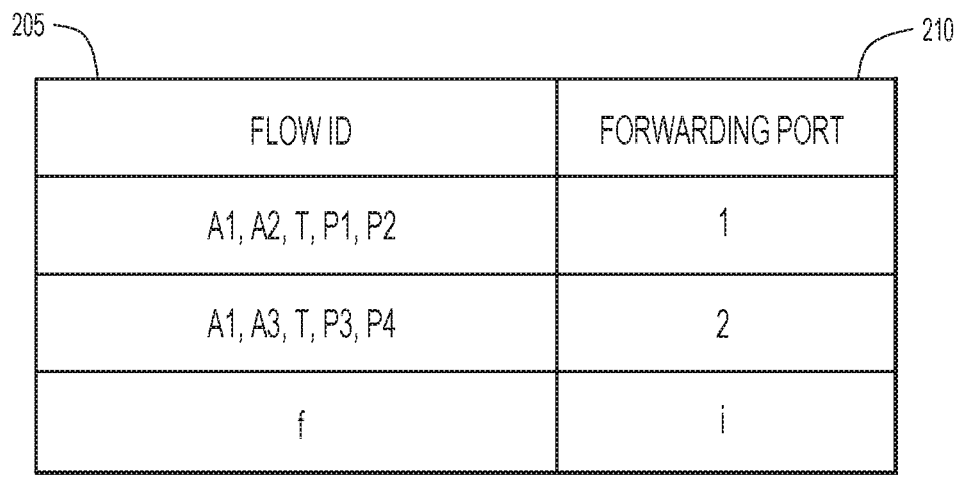
FIG. 2A illustrates a forwarding table in which forwarding ports are associated with respective flows, according to an example embodiment.

In one example embodiment, a collection network node comprising a plurality of ingress ports obtains, at a first one of the plurality of ingress ports, a first copy of a packet of a packet flow comprising a plurality of packets. The collection network node determines whether the collection network node had previously obtained a copy of any of the plurality of packets of the packet flow. When it is determined that the collection network node had previously obtained a copy of any of the plurality of packets of the packet flow, the collection network node determines whether the collection network node had previously obtained a copy of any of the plurality of packets of the packet flow at the first one of the plurality of ingress ports or at a different one of the plurality of ingress ports. When it is determined that the collection network node had previously obtained a copy of any of the plurality of packets of the packet flow at a different one of the plurality of ingress ports, the collection network node refrains from forwarding the first copy of the packet of the packet flow.

EXAMPLE EMBODIMENTS

With reference made to FIG. 1, shown is a system 100 that includes a production network 110, a collection network 120, and one or more collection servers 130. Production network 110 includes network nodes (e.g., switches, routers, etc.) 140(1)-140(4). Collection network 120 includes network nodes 150(1)-150(3) and, in certain examples, collection server 130. Network node 150(1) includes ports 160(1)-160(3), network node 150(2) includes ports 170(1)-170(3), and network node 150(3) includes ports 180(1)-180(3). In one example, collection network 120 is a Cisco System, Inc. Nexus Data Broker (NDB) network. It will be appreciated that this is a simplified illustration provided for ease of description, and that actual production networks and collection networks may include many more network nodes than what is shown in system 100.

Network packets (e.g., Internet Protocol (IP) packets) traverse production network 110 via network nodes 140(1)-140(4). Collection network 120 monitors these packets by capturing duplicates/copies of the packets from various entry points 190(1)-190(4) in the production network 110. Entry point 190(1) is a Switch Port Analyzer (SPAN), which is software in network node 140(1) that copies packets passing through network node 140(1). Entry points 190(2)-190(4) are Test Access Points (TAPs), which are physical devices that copy packets passing through them. As shown, port 160(1) of network node 150(1) captures packets copied from entry point 190(1), port 160(2) of network node 150(1) captures packets copied from entry point 190(2), port 170(1) of network node 150(2) captures packets copied from entry point 190(3), and port 170(2) of network node 150(2) captures packets copied from entry point 190(4). Network nodes 150(1) and 150(2) send captured packets to network node 150(3), which in turn sends captured packets to collection sever 130. Since the network nodes 150(1)-150(3) are configured to collect/capture packets, the network nodes 150(1)-150(3) are sometimes referred to herein as "collection network nodes."

Conventionally, nodes in a collection network 120 operate so as to forward multiple copies of a single packet traversing production network 110 to the collection server 130. That is, conventional collection network nodes do not have any awareness as to whether a packet has already been collected thereby. As a result, in these conventional arrangements, the collection server 130 is required to search its stored packets (or hashes thereof) each time a new packet is received. For example, consider a packet that traverses network node 140(1), network node 140(2), network node 140(3), and then network node 140(4). In this example, port 160(1) would receive a copy of the packet from entry point 190(1), port 160(2) would receive a copy of the packet from entry point 190(2), and port 170(2) would receive a copy of the packet from entry point 190(4). As such, network node 150(1) would send two copies of the packet to port 180(1) of network node 150(3), and network node 150(1) would send one copy of the packet to port 180(2) of network node 150(3). Accordingly, network node 150(3) would send three copies of the packet to collection server 130.

Conventionally, in order to eliminate duplicate copies, upon receiving the captured packets, the collection server 130 would convert the captured packets to unique identifiers (e.g., a hash) for each packet that is processed (e.g., stored, cached, or forwarded), and then search its previously stored unique identifiers to determine whether there is a match. The typical unique identifier is a hash of the packet (or of a subset of the packet), which is identical for copies of the same packet. A match indicates that the hash has been previously stored, meaning that the collection server 130 has already received and stored a copy of the captured packet. The collection server 130 would not store or process this previously stored packet any further. Because captured packets may arrive at the collection server 130 at different times, the collection server 130 would store hashes for a relatively long time, resulting in a relatively large number of hashes that must be searched when the collection server 130 receives a captured packet. As such, searching the hashes stored in the collection server 130 would be a computationally intensive process that requires fast and large memories.

In this conventional example, the collection server 130 would perform three costly searches of its stored hashes (corresponding to the three copies of the packet). If not eliminated, additional copies would needlessly inflate the large amount of data that collection server 130 needs to process, and could also cause inaccurate/wrong results. However, eliminating copies at the collection server 130 is a complex and costly task. For example, the collection server 130 would possibly require specialized hardware to cope with the scale of copies that need to be processed. The large number of packet hashes that must be stored and searched at very high speeds thus contribute to a lack of scalability in conventional approaches. Duplication of packets is a major problem for conventional storage, caching, and communication (e.g., network monitoring, network traffic analysis, metering, etc.).

Accordingly, duplication prevention logic 195(1)-195(3) is provided on network nodes 150(1)-150(3), respectively, and causes network nodes 150(1)-150(3) to perform operations described herein. Briefly, duplication prevention logic 195(1)-195(3) prevents duplication at the collection server 130 by causing network nodes 150(1)-150(3) to eliminate duplicate copies of packets as the copies are received at input ports 160(1), 120(2), 170(1), 170(2), 180(1), and 180(2) (e.g., from entry points 190(1)-190(4)). This ensures that only one copy is sent through a plurality of ports (e.g., ports 160(3), 170(3), and/or 180(3)). For example, traffic received from any given source may be free of duplicates. Duplication prevention logic 195(1)-195(3) operates on a per-flow basis, rather than on the per-packet basis of conventional approaches. As such, the complexity of duplication prevention logic 195(1)-195(3) is orders of magnitude lower than the complexity of conventional approaches, because the complexity of duplication prevention logic 195(1)-195(3) is on the order of a number of flows received as opposed to the order of a number of packets received. Therefore, duplication prevention logic 195(1)-195(3) requires minimal memory and processing power compared to conventional approaches.

More specifically, duplication prevention logic 195(1)-195(3) causes each respective network node 150(1)-150(3) that obtains a first copy of a packet of a flow at a port of the respective network node 150(1)-150(3) to determine whether the respective network node 150(1)-150(3) had previously obtained a second copy of a packet of the flow. If it is determined that the respective network node 150(1)-150(3) had previously obtained the second copy of a packet of the flow, the respective network node 150(1)-150(3) determines whether the respective network node 150(1)-150(3) had previously obtained the second copy of a packet of the flow at the port at which the first copy of a packet of the flow was obtained. If it is determined that the respective network node 150(1)-150(3) had not previously obtained the second copy of a packet of the flow at that port, the respective network node 150(1)-150(3) refrains from forwarding the first copy of a packet of the flow.

Consider again the example of the packet that traverses network node 140(1), network node 140(2), network node 140(3), and then network node 140(4). The packet is part of a flow of packets. The flow may be characterized by, for example, the five-tuple including the source IP address, destination IP address, Layer 4 (L4) protocol, source transport port, and destination transport port. Any packet that has that five-tuple may be considered to be part of the same flow as the packet in this example. Packets that are captured in collection network 120 may be encapsulated in headers and therefore have differing IP addresses, L4 protocols, and ports. However, for the purpose of preventing duplication of network traffic, duplication prevention logic 195(1)-195(3) considers only the flow (e.g., the IP addresses, L4 protocol, and ports) as in production network 110.

In this example, duplication prevention logic 195(1)-195(3) ensures that collection server 130 receives only a single copy of the packet (instead of receiving three copies, as in conventional approaches). Initially, network node 150(1) obtains, at port 160(1), a copy of the packet from entry point 190(1). Network node 150(1) determines whether network node 150(1) had previously obtained a copy of a packet of the flow. In this example, it is determined that network node 150(1) had not previously obtained a copy of a packet of the flow. In other words, network node 150(1) determines that the copy of the packet received at port 160(1) is the first copy of any packet in the flow received by network node 150(1). Thus, network node 150(1) indicates (e.g., in memory of network node 150(1)) that a copy of a packet of the flow has been received at port 160(1). Network node 150(1) may thereby designate port 160(1) as the forwarding port for the flow. Network node 150(1) forwards the copy of the packet to the collection server 130.

Subsequently, network node 150(1) obtains, at port 160(2), a copy of the packet from entry point 190(2). Network node 150(1) determines whether network node 150(1) had previously obtained a copy of a packet of the flow. In this example, it is determined that network node 150(1) had previously obtained a copy of a packet of the flow. The network node 150(1) then proceeds to determine whether the network node 150(1) had previously obtained a copy of a packet in the flow at port 160(2). In this example, it is determined that network node 150(1) had not previously obtained a copy of a packet of the flow at port 160(2). In other words, network node 150(1) has determined that network node 150(1) had previously obtained a copy of a packet in the flow at a port other than port 160(2) (namely, port 160(1)). Thus, network node 150(1) refrains from forwarding the copy of the packet to network node 150(3). Accordingly, network node 150(1) forwards only one copy of the packet to network node 180(3).

Next, network node 150(2) obtains, at port 170(2), a copy of the packet from entry point 190(4). Network node 150(2) determines whether network node 150(2) had previously obtained a copy of a packet of the flow. In this example, it is determined that network node 150(2) had not previously obtained a copy of a packet of the flow. In other words, network node 150(2) determines that the copy of the packet received at port 170(2) is the first copy of any packet in the flow received by network node 170(2). Thus, network node 150(2) indicates (e.g., in memory of network node 150(2)) that a copy of a packet of the flow has been received at port 170(2), and forwards the copy of the packet to network node 150(3).

Network node 150(3) obtains, at port 180(1), a copy of the packet from port 160(3) of network node 150(1). Network node 150(3) determines whether network node 150(3) had previously obtained a copy of a packet of the flow. In this example, it is determined that network node 150(3) had not previously obtained a copy of a packet of the flow. In other words, network node 150(3) determines that the copy of the packet received at port 180(1) is the first copy of any packet in the flow received by network node 180(1). Thus, network node 150(3) indicates (e.g., in memory of network node 150(3)) that a copy of a packet of the flow has been received at port 180(1). Network node 150(3) may thereby designate port 180(1) as the forwarding port for the flow. Network node 150(3) forwards the copy of the packet to the collection server 130.

Subsequently, network node 150(3) also obtains, at port 180(2), a copy of the packet from port 170(3) of network node 150(2). Network node 150(3) determines whether network node 150(3) had previously obtained a copy of a packet of the flow. In this example, it is determined that network node 150(3) had previously obtained a copy of a packet of the flow. The network node 150(3) then proceeds to determine whether the network node 150(3) had previously obtained a copy of a packet in the flow at port 180(2). In this example, it is determined that network node 150(3) had not previously obtained a copy of a packet of the flow at port 180(2). In other words, network node 150(3) has determined that network node 150(3) had previously obtained a copy of a packet in the flow at a port other than port 180(2) (namely, port 180(1)). Thus, network node 150(3) refrains from forwarding the copy of the packet to collection server 130. Accordingly, network node 150(3) forwards only one copy of the packet to collection server 130. Since collection server 130 receives no duplicate copies of the packet, collection server 130 need not expend valuable resources searching hashes of packets.

A subsequent packet may traverse the same network path as the previous packet (i.e., network node 140(1), network node 140(2), network node 140(3), and then network node 140(4)). This subsequent packet may be part of the same flow (e.g., have the same five-tuple) as the previous packet. Here, network node 150(1) obtains, at port 160(1), a copy of the subsequent packet from entry point 190(1). Network node 150(1) determines whether network node 150(1) had previously obtained a copy of a packet of the flow. In this example, it is determined that network node 150(1) had previously obtained a copy of a packet of the flow. The network node 150(1) then proceeds to determine whether the network node 150(1) had previously obtained a copy of a packet in the flow at port 160(1). Here, it is determined that network node 150(1) had previously obtained a copy of a packet of the flow at port 160(1) (i.e., that port 160(1) is the forwarding port for the flow). Therefore, network node 150(1) forwards the copy of the subsequent packet to port 180(1) of network node 150(3).

Next, network node 150(1) obtains, at port 160(2), a copy of the subsequent packet from entry point 190(2). Network node 150(1) determines whether network node 150(1) had previously obtained a copy of a packet of the flow. In this example, it is determined that network node 150(1) had previously obtained a copy of a packet of the flow. The network node 150(1) then proceeds to determine whether the network node 150(1) had previously obtained a copy of a packet in the flow at port 160(2). In this example, it is determined that network node 150(1) had not previously obtained a copy of a packet of the flow at port 160(2). In other words, network node 150(1) has determined that network node 150(1) had previously obtained a copy of a packet in the flow at a port other than port 160(2) (namely, port 160(1)). Thus, network node 150(1) refrains from forwarding the copy of the subsequent packet to network node 150(3). Accordingly, network node 150(1) forwards only one copy of the subsequent packet to network node 150(3).

Thereafter, network node 150(2) obtains, at port 170(2), a copy of the subsequent packet from entry point 190(4). Network node 150(2) determines whether network node 150(2) had previously obtained a copy of a packet of the flow. In this example, it is determined that network node 150(2) had previously obtained a copy of a packet of the flow. The network node 150(2) then proceeds to determine whether the network node 150(2) had previously obtained a copy of a packet in the flow at port 170(2). Here, it is determined that network node 150(2) had previously obtained a copy of a packet of the flow at port 170(2) (i.e., that port 170(2) is the forwarding port for the flow). Therefore, network node 150(2) forwards the copy of the subsequent packet to port 180(2) of network node 150(3).

Network node 150(3) obtains, at port 180(1), a copy of the subsequent packet from port 160(3) of network node 150(1). Network node 150(3) determines whether network node 150(3) had previously obtained a copy of a packet of the flow. In this example, it is determined that network node 150(3) had previously obtained a copy of a packet of the flow. The network node 150(3) then proceeds to determine whether the network node 150(3) had previously obtained a copy of a packet in the flow at port 180(1). Here, it is determined that network node 150(3) had previously obtained a copy of a packet of the flow at port 180(1) (i.e., that port 180(1) is the forwarding port for the flow). Therefore, network node 150(3) forwards the copy of the subsequent packet to collection server 130.

Subsequently, network node 150(3) also obtains, at port 180(2), a copy of the subsequent packet from port 170(3) of network node 150(2). Network node 150(3) determines whether network node 150(3) had previously obtained a copy of a packet of the flow. In this example, it is determined that network node 150(3) had previously obtained a copy of a packet of the flow. The network node 150(3) then proceeds to determine whether the network node 150(3) had previously obtained a copy of a packet in the flow at port 180(2). In this example, it is determined that network node 150(3) had not previously obtained a copy of a packet of the flow at port 180(2). In other words, network node 150(3) has determined that network node 150(3) had previously obtained a copy of a packet in the flow at a port other than port 180(2) (namely, port 180(1)). Thus, network node 150(3) refrains from forwarding the copy of the packet to collection server 130. Accordingly, network node 150(3) forwards only one copy of the packet to collection server 130. Since collection server 130 receives no duplicate copies of the packet, collection server 130 need not expend valuable resources searching hashes of packets.

In this example, network nodes 150(1)-150(3) only forward one copy of each packet in the flow. By designating only one of ports 160(1)-160(3), 170(1)-170(3), and 180(1)-180(3) on each network node 150(1)-150(3) as a forwarding port, network nodes 150(1)-150(3) may analyze copies of packets on a per-flow basis (i.e., based on which flow the packet belongs to). Since the collection server 130 only receives a single copy of each packet, collection server 130 can avoid the computationally intensive hash searching operation that is performed in conventional systems.

As described herein, duplication prevention logic 195(1)-195(3) may be implemented using a table or a register. Briefly, determining whether the network node had previously obtained a copy of a packet of the flow may include determining whether the flow is stored in a table or in a register, and determining whether the network node had previously obtained a copy of a packet of the flow at the port may include determining whether the table or register associates the flow with the port. Implementation using a table is described with reference to FIGS. 2A-9D, and implementation using a register is described with reference to FIGS. 10A-13B.

FIG. 2A illustrates a forwarding table 200A including forwarding ports associated with respective flows. Network nodes 150(1)-150(3) may include respective forwarding tables, with network node 150(1), for example, including forwarding table 200A. As shown, forwarding table 200A includes a column of flow identifiers (IDs) 205 and a column of forwarding ports 210. Each flow ID in column 205 is, for example, the five-tuple of a different flow of one or more packets obtained by network node 150(1). The first flow ID in column 205 has the five-tuple "A1, A2, T, P1, P2," and the second flow ID has the five-tuple "A1, A3, T, P3, P4". Here, "A1" represents a source IP address of the first and second flows, "A2" represents a destination IP address of the first flow, "A3" represents the source IP address of the second flow, "T" represents the L4 protocol of the first and second flows, "P1" represents a source transport port of the first flow, "P2" represents a destination transport port of the first flow, "P3" represents a third destination transport port of the second flow, and "P4" represents a fourth destination transport port of the second flow. Even though the flows share the same source IP address and L4 transport protocol, the flows are distinct because their five-tuples are not identical (i.e., the flows have different destination IP addresses, source transport ports, and destination transport ports). Forwarding table 200A further includes generic flow ID f and corresponding forwarding port i.

Figure 2B:
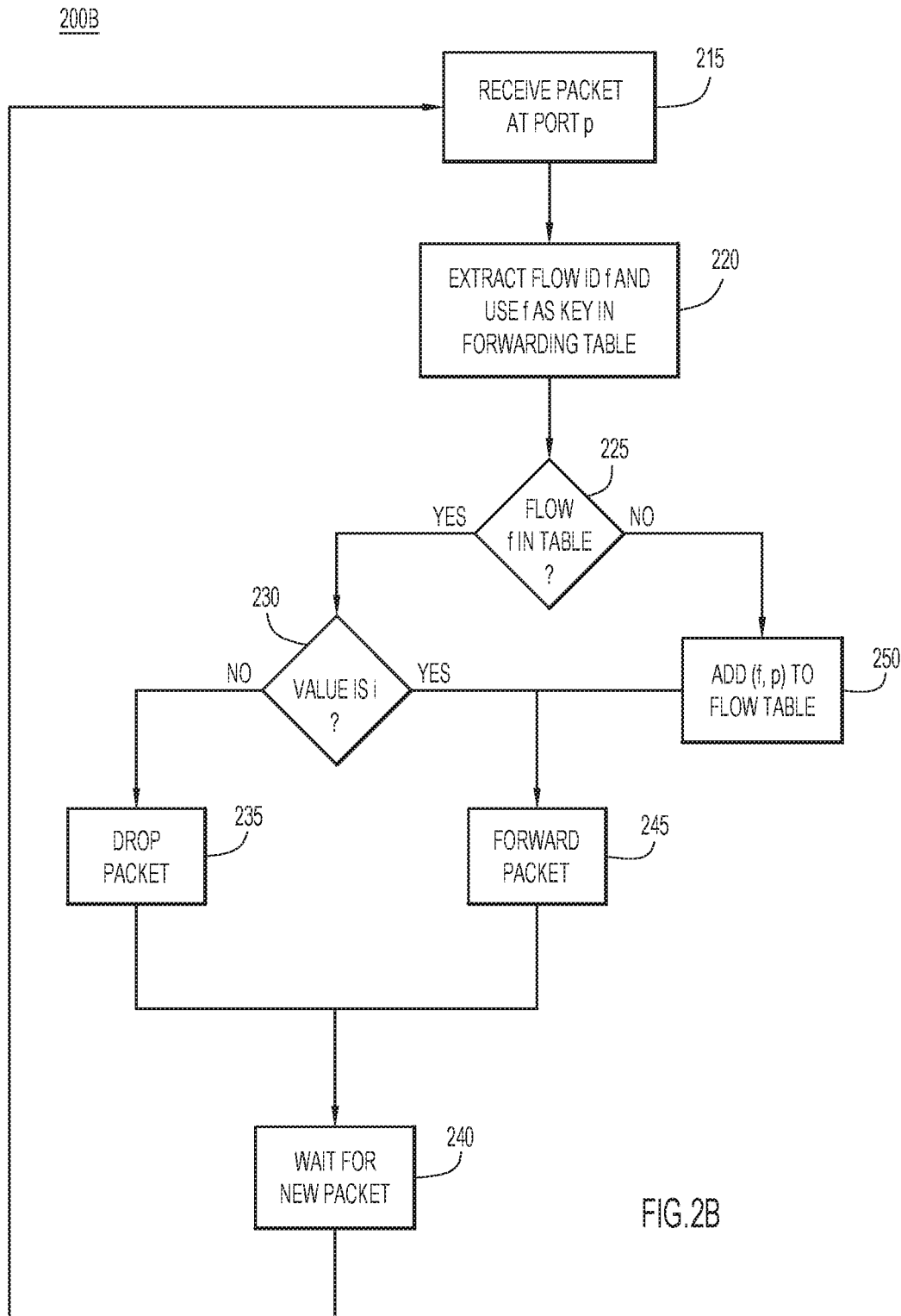
FIG. 2B illustrates a method for preventing duplication of packets in a collection network based on the forwarding table of FIG. 2A, according to an example embodiment.

FIG. 2B illustrates a method 200B of preventing duplication of packets in a collection network based on the forwarding table 200A. Method 200B may be performed at any network node (e.g., network node 150(1)). At 215, the network node receives a packet at port p (e.g., port 160(1) or 160(2)). At 220, the network node extracts the flow ID f from the packet and uses flow ID f as a key in the forwarding table 200A. At 225, the network node determines whether flow ID f is already in the forwarding table 200A (i.e., whether the network node had previously obtained a copy of a packet of the flow with flow ID f). If it is determined that the flow ID f is already in the forwarding table 200A, at 230 the network node determines whether port p at which the packet was received is the forwarding port i associated with flow ID f (i.e., whether the network node had previously obtained a copy of a packet of flow ID f at port p). If it is determined that the network node had not previously obtained a copy of a packet of the flow at the port, at 235 the network node drops the packet. At 240, the network node waits to receive a new packet before performing method 200B again.

Returning to 230, if it is determined that the network node had previously obtained a copy of a packet of the flow at the port, at 245 the network node forwards the packet (e.g., to network node 150(3)). The network node then waits for a new packet at 240. Returning to 225, if it is determined that the flow ID f is not already in the forwarding table 200A, at 250 the network node adds flow ID f and port p to the forwarding table 200A. The network node then forwards the packet at 245 and waits for a new packet at 240.

Routing changes may cause the collection network 120 to lose packets (i.e., no copy of the packet is forwarded to the collection server 130). For example, with reference back to FIG. 1, a packet may initially traverse network node 140(1), network node 140(2), network node 140(3), and then network node 140(4). As such, network node 160(1) may establish port 160(1) as the forwarding port and drop any copies of packets in the flow received at port 160(2). However, consider a routing change such that packets in that flow now traverse network node 140(2), network node 140(3), and then network node 140(4) (i.e., without traversing network node 140(1)). Here, network node 150(1) would not forward any packets in that flow because network node 150(1) is receiving packets only on port 160(2), and not on forwarding port 160(1). Routing changes in the collection network 120 may also cause lost packets because such changes might result in packets reaching a network node (e.g., network node 150(3)) through different ports.

Accordingly, the network node 150(1) may determine whether the network node 150(1) had previously obtained a copy of a packet of the flow within a period of time. This allows the network node to forward packets received from ports that were not originally designated as forwarding ports, if appropriate (e.g., the network node may change/update its forwarding ports). As such, entries in forwarding table 200A that have not been used for a certain amount of time may be removed ("flushed"). Since entries are used independently of each other, entries do not need to be flushed at the same time or within a certain amount of time of each other. This is particularly important considering that in order to ensure very high rate operations, the solution may be implemented in hardware (e.g., an Application Specific Integrated Circuit (ASIC)).

However, flushing different entries at different times may involve maintaining an inactivity timer for each entry, which may be a relatively high complexity operation. A lower-complexity solution may involve flushing all entries in a forwarding table periodically (e.g., every 50 ms). Since in some implementations flushing an entry is a costly operation on certain hardware devices, valid bits may be used instead to signal whether a packet received at a forwarding port should be forwarded. FIG. 3A illustrates a forwarding table 300A that is similar to forwarding table 200A, but includes a column for valid bits 305. For example, "T" may signal that a packet received at a forwarding port should be forwarded, and "F" may signal that a packet received at a forwarding port should not. The network node may periodically reset the valid bit of each entry in forwarding table 300A to "F".

Figure 3B:
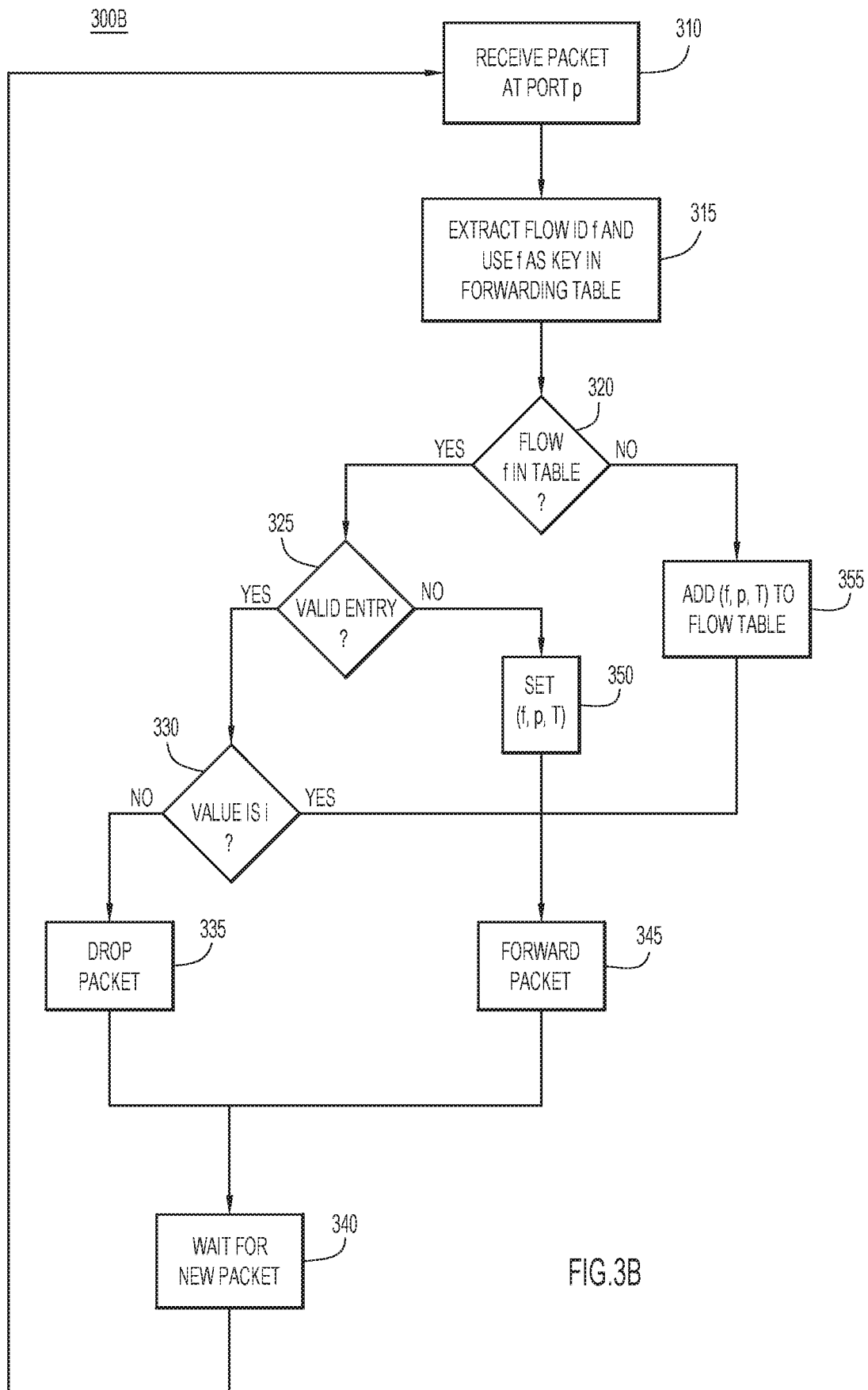
FIG. 3B illustrates a method for preventing duplication of packets in a collection network based on the forwarding table of FIG. 3A, according to an example embodiment.

FIG. 3B illustrates a method 300B of preventing duplication of packets in collection network 120 based on forwarding table 300A. Method 300B may be performed at any network node (e.g., network node 150(1)). At 310, the network node receives a packet at forwarding port i (e.g., port 160(1) or 160(2)). At 315, the network node extracts the flow ID f from the packet and uses flow ID f as a key in the forwarding table 300A. At 320, the network node determines whether flow ID f is already in the forwarding table 300A. If it is determined that the flow ID f is already in the forwarding table 300A, at 325 the network node determines whether the entry is valid (i.e., whether the corresponding valid bit is "T"). If it is determined that the entry is valid, at 330 the network node determines whether port p at which the packet was received is the forwarding port i associated with flow ID f (i.e., whether the network node had previously obtained a copy of a packet of flow ID f at port p). If it is determined that the network node had not previously obtained a copy of a packet of the flow at the port, at 335 the network node drops the packet and, at 340, waits to receive a new packet before performing method 300B again. If it is determined that the network node had previously obtained a copy of a packet of the flow at port p, at 345 the network node forwards the packet (e.g., to network node 150(3)) and, at 340, waits to receive a new packet before performing method 300B again.

Returning to 325, if it is determined that the entry is not valid, at 350 the network node sets the valid bit corresponding to flow ID f to "T" to indicate that the packet was received. The network node then forwards the packet at 345 and waits for a new packet at 340. Returning to 320, if it is determined that the flow ID f is not already in the forwarding table 300A, at 355 the network node adds flow ID f and associated forwarding port i (with a valid bit set to "T") to the forwarding table 300A. The network node then forwards the packet at 345 and waits for a new packet at 340.

Figure 4A:
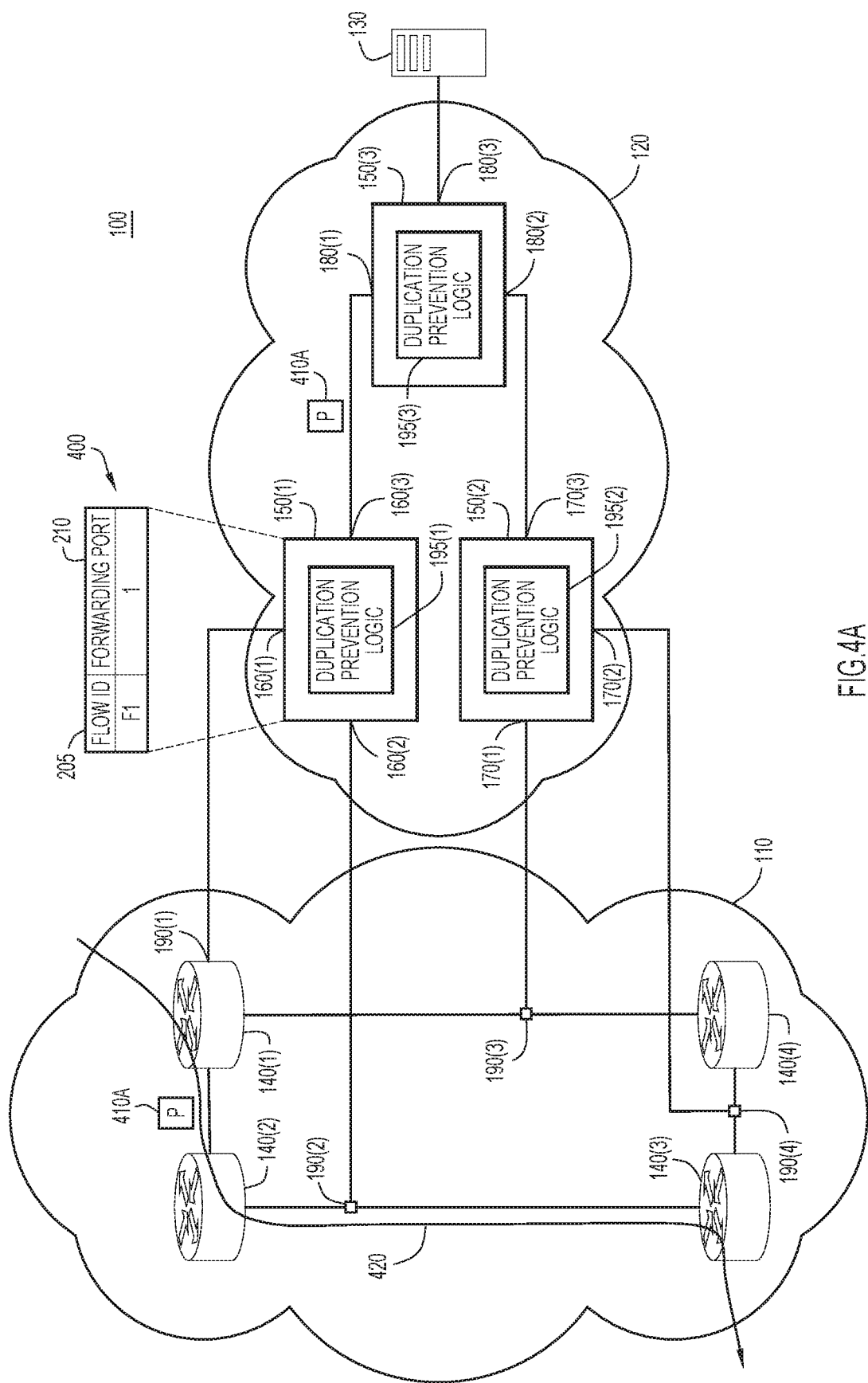
FIGS. 4A-4C illustrate the system of FIG. 1 at respective times over the course of which a packet is duplicated as a result of flushing a forwarding table, according to an example embodiment.
Figure 4B:
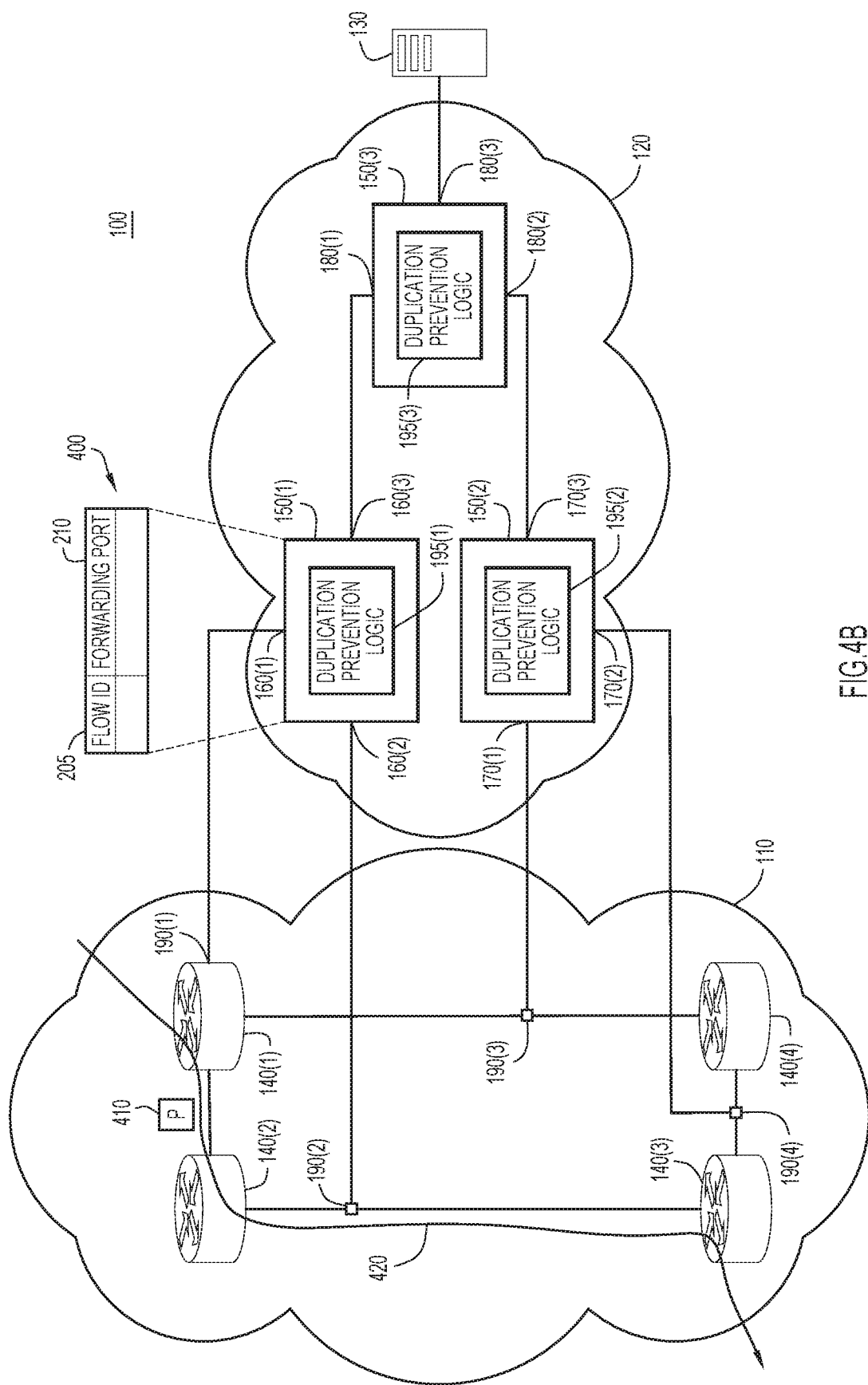
Figure 4C:
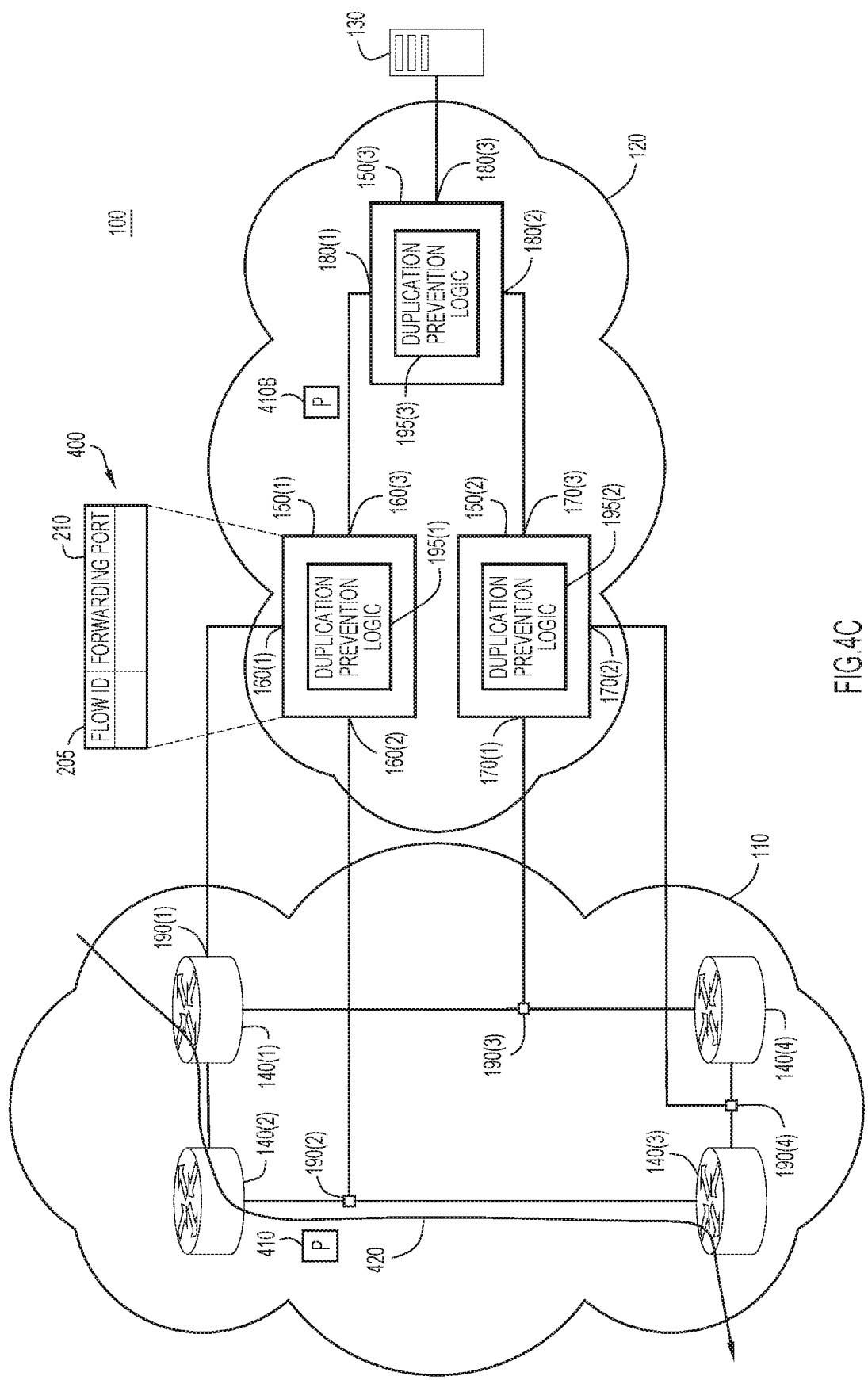

Although techniques described thus far generally prevent collection server 130 from receiving duplicate copies of a packet, duplication may nonetheless occasionally occur due to unfortunately timed flushes. More specifically, a network node may forward duplicates if the flush timer expires (i.e., a forwarding table is flushed) after a copy of a packet has entered collection network 120 from one entry point but before another copy of the packet enters collection network 120 from another entry point. FIGS. 4A-4C, for example, illustrate system 100 at respective times over the course of which a packet is duplicated as a result of flushing a forwarding table.

FIG. 4A illustrates system 100 at a first point in time. Network node 150(1) includes a forwarding table 400 with a flow ID column 205 and a forwarding port column 210. A packet 410 follows path 420 through production network 110 (i.e., network node 140(1), 140(2), and then 140(3)). As such, initially, network node 140(1) receives a copy of packet 410 at forwarding port 160(1) and forwards the copy 410A to network node 150(3). As illustrated in FIG. 4B, after the copy of the packet 410 is received at forwarding port 160(1), but before the packet 410 reaches entry point 190(2), forwarding table 400 is flushed. As shown in FIG. 4C, when packet 410 reaches entry point 190(2), network node 150(1) receives another copy of packet 410 (this time at port 160(2)). Since the forwarding table 400 has been flushed and port 160(1) is no longer indicated as the forwarding port for the flow of packet 410, network node forwards another copy 410B to network node 150(3).

Therefore, because network node 150(3) receives both copies 410A and 410B at its forwarding port 180(1), network node 150(3) forwards both copies to collection server 130. Generally, network node 150(1) would refrain from forwarding the copy of the packet 410 that is subsequently received at port 160(2) because port 160(1) has already been designated at the forwarding port. Here, however, network node 150(1) forwards a copy of packet 410 from port 160(2) in addition to port 160(1) because of the unfortunately timed flushing of table 400. Increasing the flush timer may reduce the probability of this scenario occurring, but also makes the network node 150(1) take longer to react to routing changes (i.e., packets may be lost).

Figure 5B:
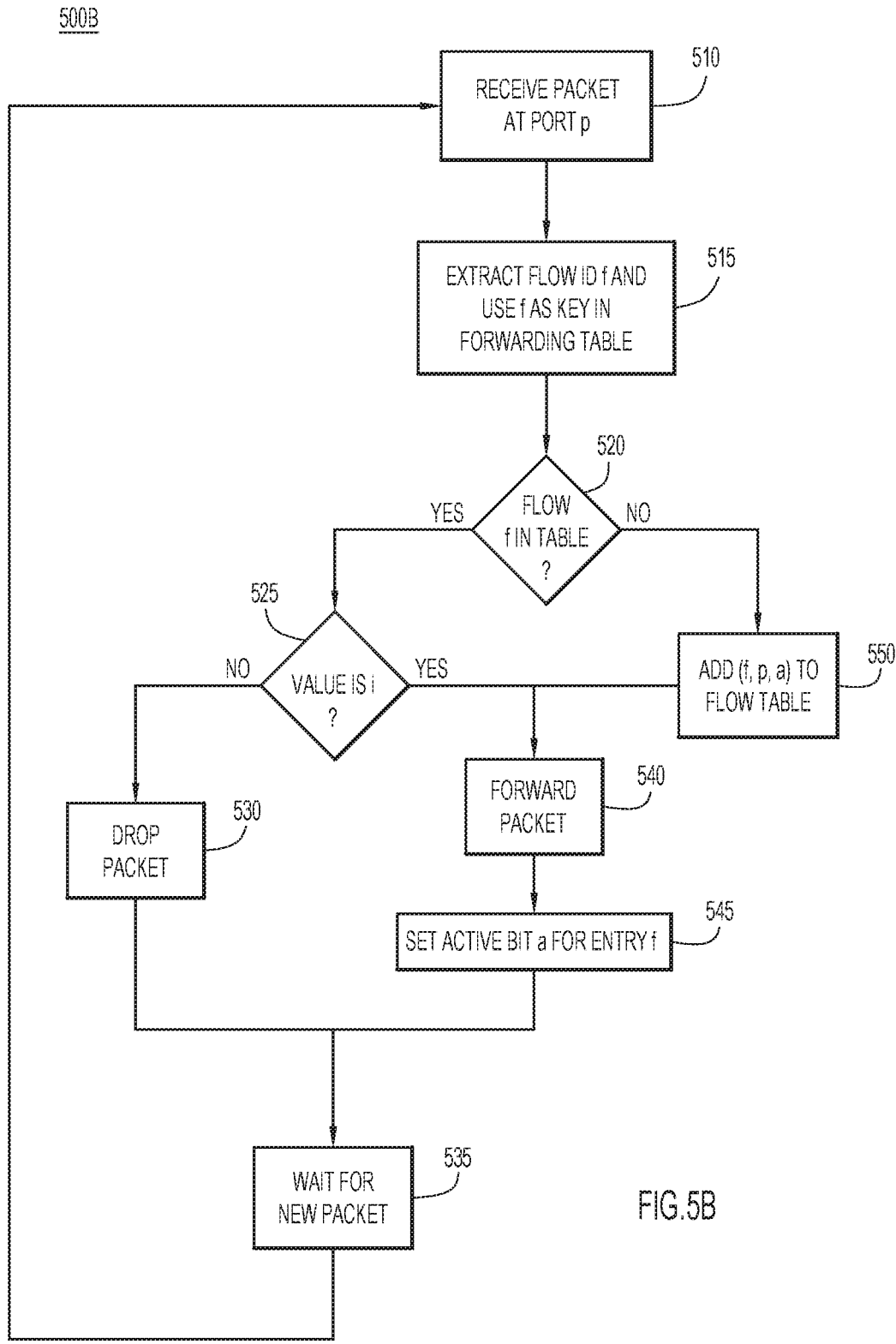
FIG. 5B illustrates a method for preventing duplication of packets in a collection network based on the forwarding table of FIG. 5A, according to an example embodiment.
Figure 5C:
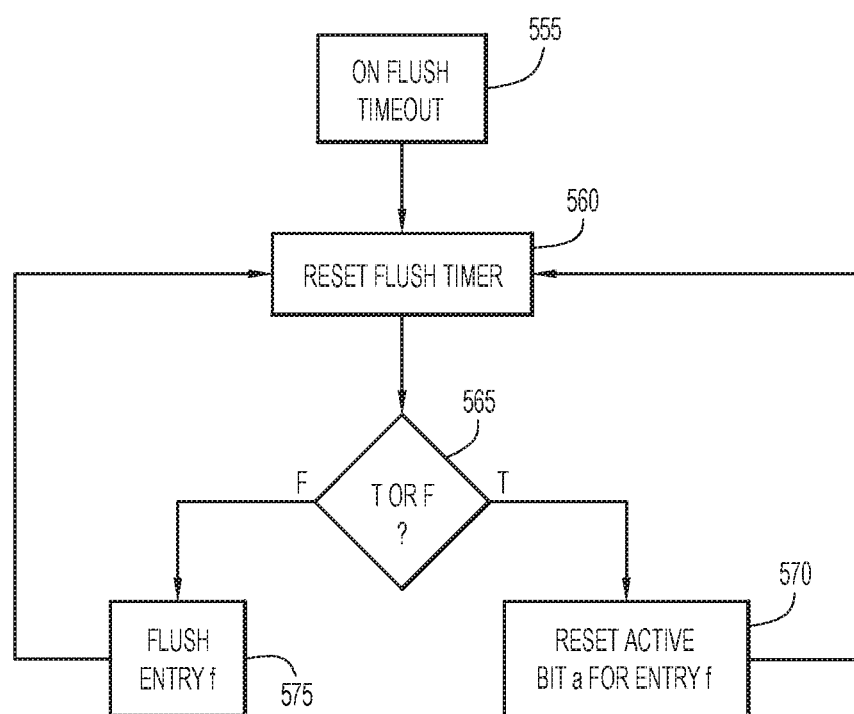
FIG. 5C illustrates a method for flushing a forwarding table based on the forwarding table of FIG. 5A, according to an example embodiment.

Accordingly, in one example, the network node 150(1) may determine whether the network node 150(1) had previously obtained a copy of a packet of the flow within a period of time based on the time at which the port had previously obtained a copy of a packet of the flow. In this example, duplicates may be minimized/eliminated by flushing only entries that have not been used during the last flush period. As shown in FIGS. 5A-5C, active bits may be utilized to eliminate duplicates in this manner. FIG. 5A illustrates a forwarding table 500A that is similar to forwarding table 200A, but includes a column for active bits 505. For example, "T" may signal that a packet of a given flow has been received within some time period, and "F" may signal that a packet of a given flow has not. Entries with active bit "T" are not flushed on a flush timeout, and entries with active bit "F" are.

FIG. 5B illustrates a method 500B of preventing duplication of packets in collection network 120 based on forwarding table 500A. Method 500B may be performed at any network node (e.g., network node 150(1)). At 510, the network node receives a packet at port p (e.g., port 160(1) or 160(2)). At 515, the network node extracts the flow ID f from the packet and uses flow ID f as a key in the forwarding table 500A. At 520, the network node determines whether flow ID f is already in the forwarding table 500A. If it is determined that the flow ID f is already in the forwarding table 500A, at 525 the network node determines whether port p at which the packet was received is the forwarding port i associated with flow ID f (i.e., whether the network node had previously obtained a copy of a packet of flow ID f at port p). If it is determined that the network node had not previously obtained a copy of a packet of the flow at port p, at 530 the network node drops the packet and, at 535, waits to receive a new packet before performing method 500B again.

Returning to 525, if it is determined that the network node had previously obtained a copy of a packet of the flow at port p, at 540 the network node forwards the packet (e.g., to network node 150(3)) and, at 545, sets the active bit corresponding to the flow of the packet to "T". At 535, the network node waits to receive a new packet before performing method 500B again. Returning to 520, if it is determined that the flow ID f is not already in the forwarding table 500A, the network node adds flow ID f and port p to the forwarding table 500A. The network node then forwards the packet at 540, sets the active bit corresponding to the flow of the packet to "T", and waits for a new packet at 535.

FIG. 5C illustrates a method 500C of flushing forwarding table 500A. At 555, a flush timeout occurs, and at 560, the network node resets the flush timer. At 565, for each entry in forwarding table 500A, the network node determines whether the active bit is set to "T" or "F". If an active bit is set to "T", that active bit is reset to "F" at 570. If an active bit is set to "F", the network node flushes the corresponding entry at 575.

Methods 500B and 500C may limit reactivity to route changes as the network node always takes at least one flush period (during which no packets of a given flow are received through the forwarding port stored in the forwarding table) before eliminating the entry and being able to accept packets from another forwarding port. Hence, the minimum, maximum and average reaction time (during which packets may not be forwarded to the collection server 130) are two, one, and one-and-a-half flush periods, respectively. By contrast, in method 200B those values are one, two, and one-half flush periods, respectively. As such, using active bits eliminates duplicates but also increases the probability of not delivering (i.e., losing) packets.

Figure 6A:
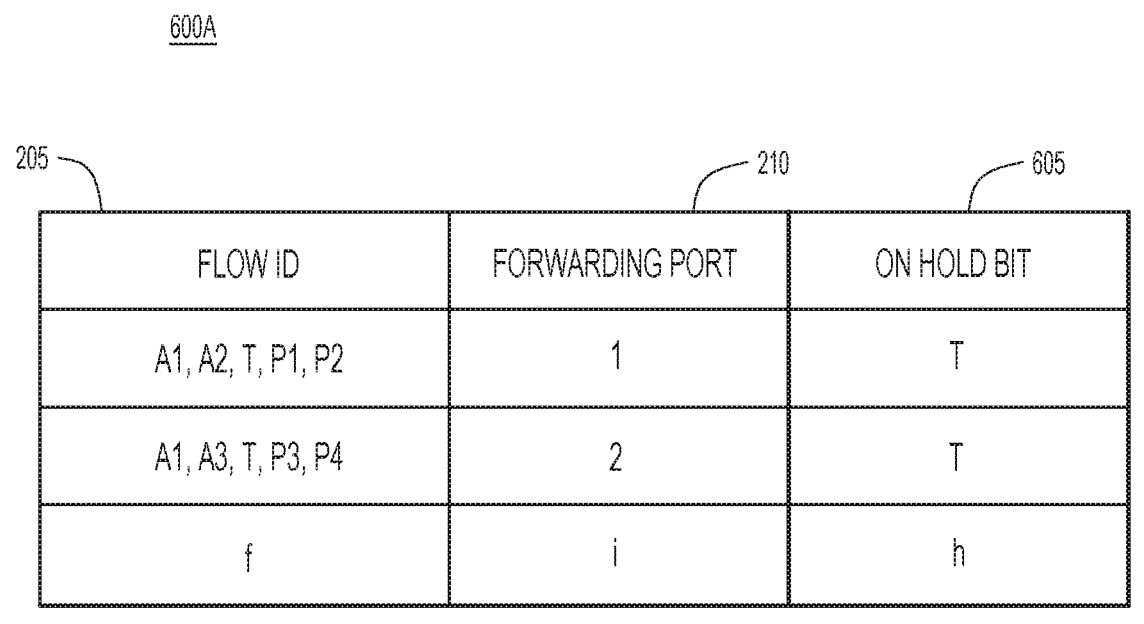
Figure 6B:
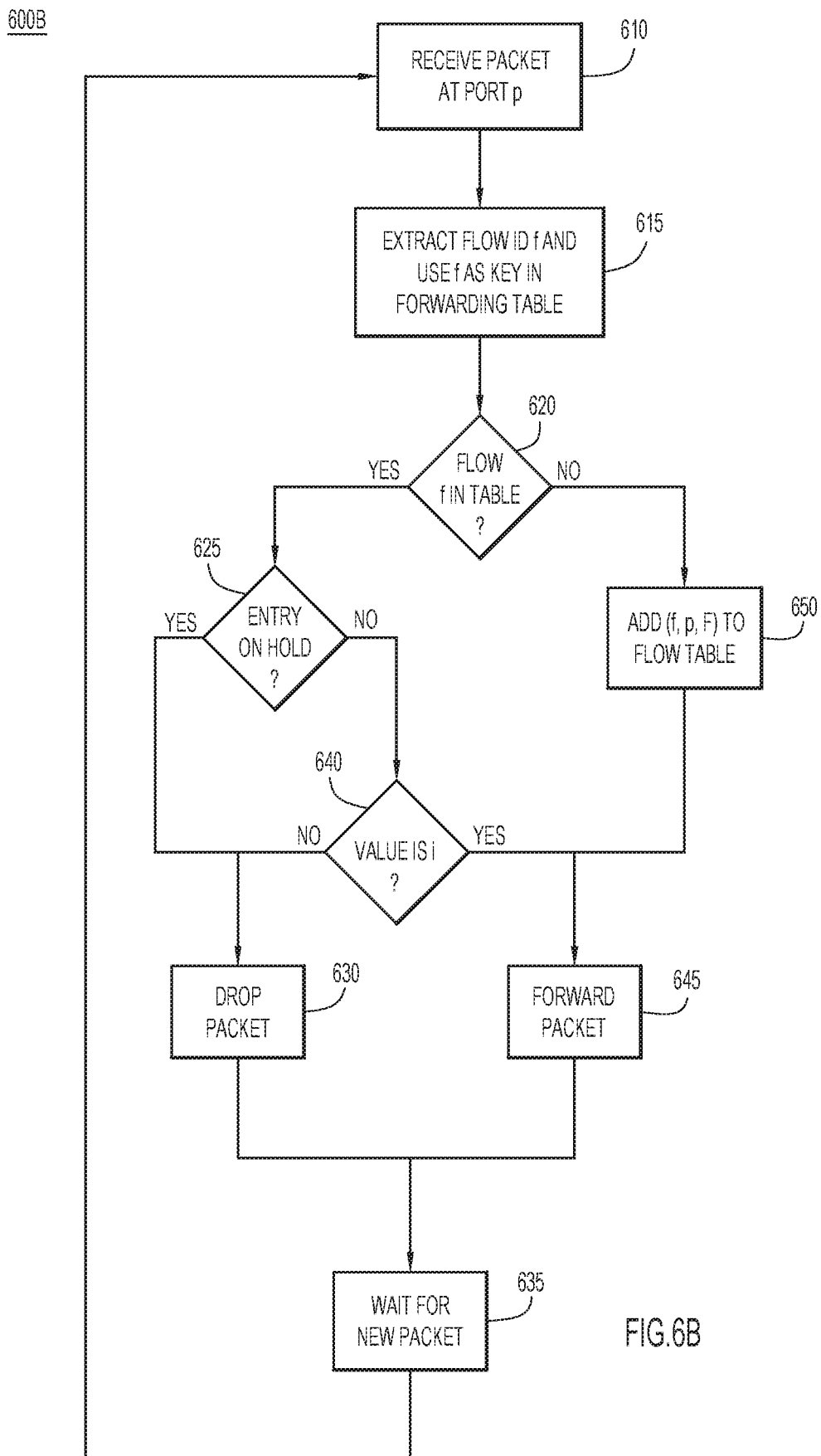
FIG. 6B illustrates a method for preventing duplication of packets in a collection network based on the forwarding table of FIG. 6A, according to an example embodiment.

In an alternate example of eliminating duplicates, duplicates may be minimized/eliminated using a hold period, preceding the flushing of the forwarding table, during which packets are not forwarded. As shown in FIGS. 6A and 6B, on-hold bits may be utilized to eliminate duplicates in this manner. FIG. 6A illustrates a forwarding table 600A that is similar to forwarding table 200A, but includes a column for on-hold bits 605. For example, "T" may signal that a predetermined amount of time (on-hold period) for an entry has not yet expired, and "F" may signal that the predetermined amount of time has expired.

FIG. 6B illustrates a method 600B of preventing duplication of packets based on forwarding table 600A. Method 600B may be performed by a network node (e.g., network node 150(1)). At 610, the network node receives a packet at port p (e.g., port 160(1) or 160(2)). At 615, the network node extracts the flow ID f from the packet and uses flow ID f as a key in the forwarding table 600A. At 620, the network node determines whether flow ID f is already in the forwarding table 600A. If it is determined that the flow ID f is already in the forwarding table 600A, at 625 the network node determines whether the entry is on hold (i.e., whether the on-hold bit is set to "T"). If it is determined that the entry is on hold, the network node drops the packet at 630, and waits for a new packet at 635 before performing method 600B again.

Returning to 625, if it is determined that is entry is not on hold, at 640 the network node determines whether port p at which the packet was received is the forwarding port i associated with flow ID f (i.e., whether the network node had previously obtained a copy of a packet of flow ID f at port p). If it is determined that the network node had not previously obtained a copy of a packet of the flow at port p, at 630 the network node drops the packet and, at 535, waits to receive a new packet before performing method 600B again. If it is determined that the network node had previously obtained a copy of a packet of the flow at port p, at 645 the network node forwards the packet (e.g., to network node 150(3)) and, at 635, waits to receive a new packet before performing method 600B again. Returning to 620, if it is determined that the flow ID f is not already in the forwarding table 600A, at 650 the network node adds flow ID f and port p to the forwarding table 600A with an on-hold bit set to "F". The network node then forwards the packet at 645 and waits for a new packet at 635.

On flush timeout, (which occurs periodically), all on-hold bits are set to "T" and the hold timer is started. On hold timeout, all on-hold bits are reset to "F". Duplication is avoided if the hold timeout is longer than the maximum time between two copies of the same packet entering the collection network 120 from any two entry points (e.g., the time required for a packet to travel on the production network 110 between the two furthest entry points). However, this solution greatly increases the probability of losing packets. Moreover, using on-hold bits increases the complexity of the implementation since an additional timer (i.e., the on-hold timer) is required.

Figure 7A:
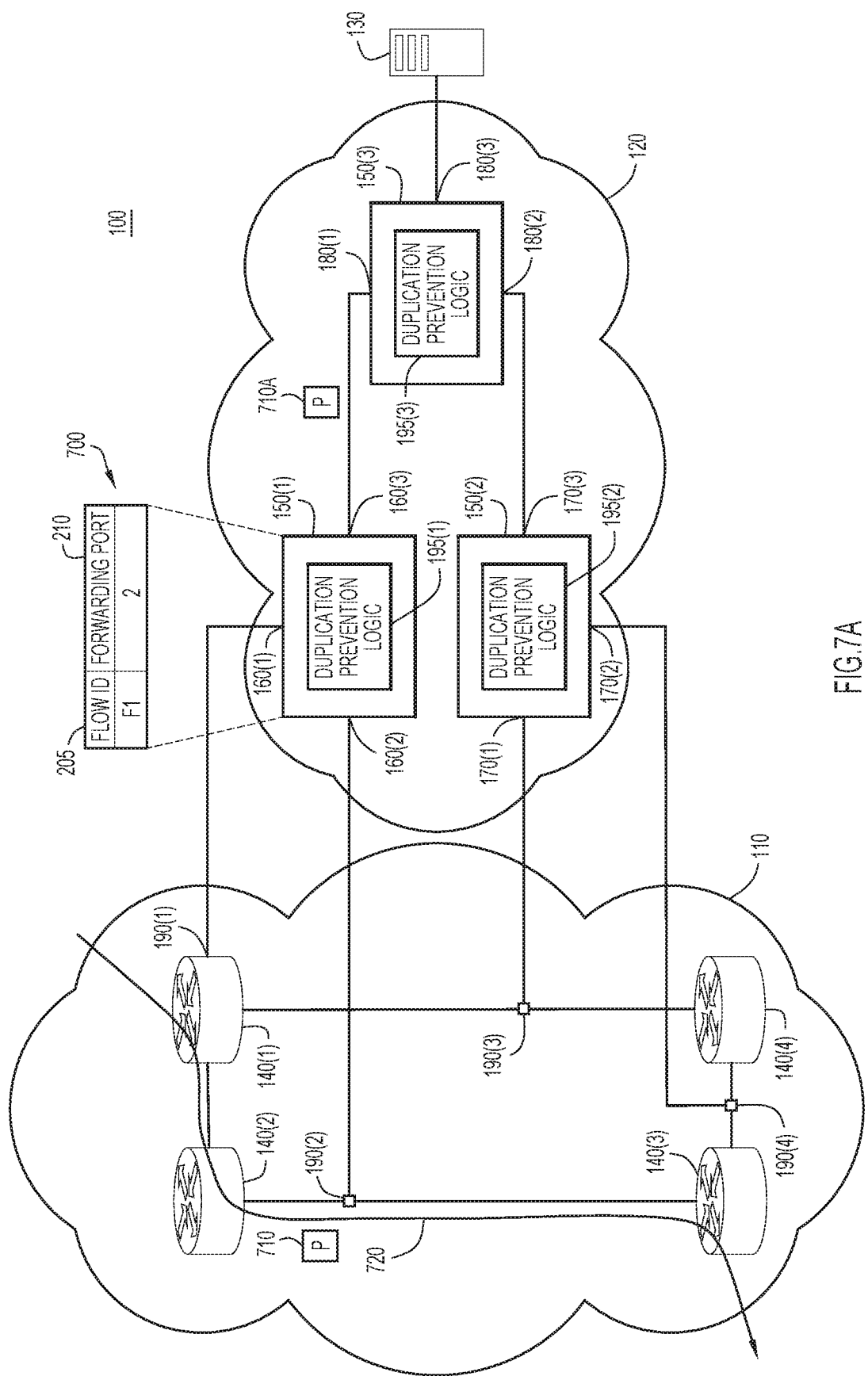
FIGS. 7A and 7B illustrate the system of FIG. 1 at respective times over the course of which a packet is lost as a result of a routing change, according to an example embodiment.
Figure 7B:
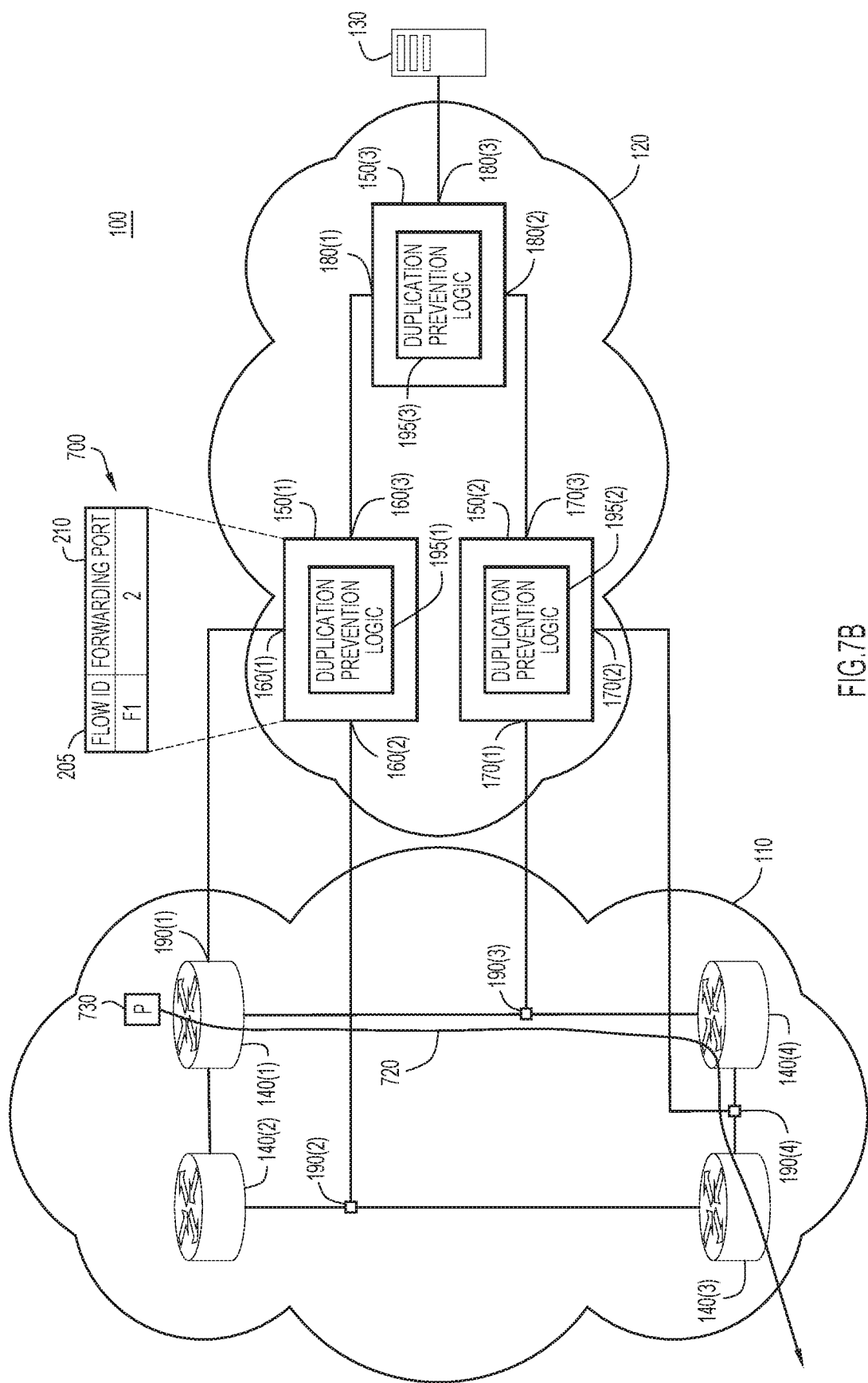

Although techniques described thus far generally avoid losing packets, packet loss may nonetheless occasionally occur due to routing changes. More specifically, a packet may be lost (e.g., not received at collection server 130) when a routing change causes packets in a flow to avoid the entry point corresponding to the forwarding port for that flow. FIGS. 7A and 7B, for example, illustrate the system of FIG. 1 at respective times over the course of which a packet is lost as a result of a routing change.

FIG. 7A illustrates system 100 at a first point in time. Network node 150(1) includes a forwarding table 700 with a flow ID column 205 and a forwarding port column 210. A packet 710 follows path 720 through production network 110 (i.e., network nodes 140(1), 140(2), and then 140(3)). Initially, network node 140(1) receives a copy of packet 710 at port 160(1), but drops that copy because port 160(1) is not the forwarding port in this example. A period of time later, network node 140(1) receives a copy of packet 710 at port 160(2) and, because port 160(2) is the forwarding port in this example, forwards the copy 710A to network node 150(3).

Subsequently, as illustrated in FIG. 7B, a routing change causes packet 730 in the same flow to follow path 740 (i.e., network nodes 140(1), 140(4), and then 140(3)). In this case, network node 140(1) receives a copy of packet 730 at port 160(1), but drops that copy because port 160(1) is not the forwarding port. However, because entry point 190(2) is not on path 740, port 160(2) never receives a copy of packet 730 and, as such, network node 150(1) does not forward a copy of the packet 730 to network node 150(3). Therefore, network node 150(3) does not forward a copy of packet 730 to the collection server 130. Although network node 150(2) forwards a copy of packet 730 to network node 150(3), network node 150(3) receives this copy at port 180(2), which is not the forwarding port in this example, and thus drops the copy of the packet 730. Meanwhile, network node 150(3) does not receive any copies of packet 730 at its forwarding port (port 180(1)) from network node 150(1). As such, collection server 130 never receives a copy of packet 730, and packet 730 is thus lost. Moreover, network node network node 150(1) will continue to refrain from forwarding any copies of packets in the flow until the flush timer expires (for example) and the flow entry in forwarding table 700 is removed from the flow table. Consequently, there is a non-trivial probability of losing some number of packets. The maximum possible number of lost packets may be $L=T_f \times R_f$, where $T_f$ is the flush timeout and $R_f$ is the maximum packet rate of a flow.

Figure 8C:
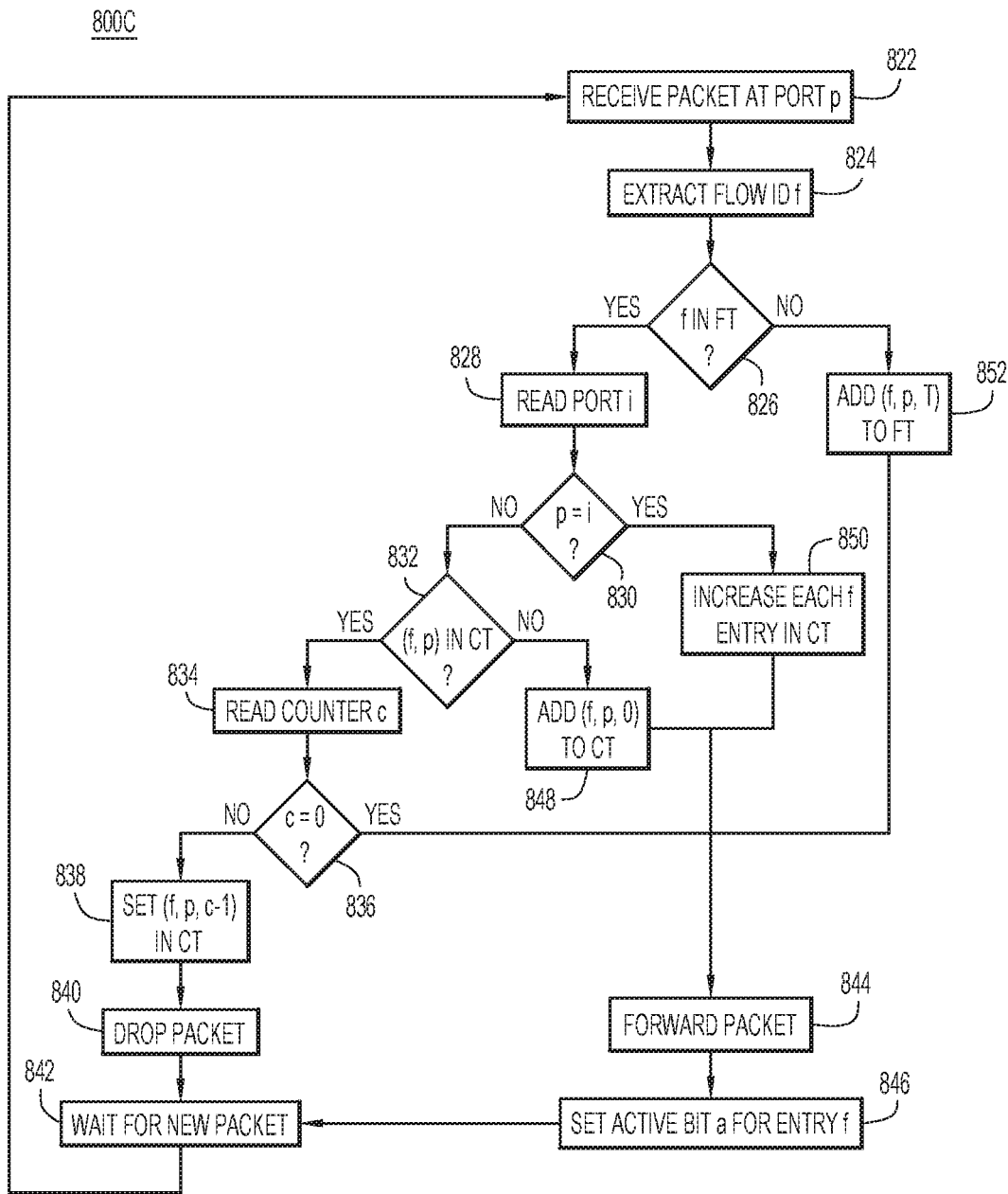
FIG. 8C illustrates a method for preventing duplication of packets in a collection network based on the forwarding table of FIG. 8A and the counter table of FIG. 8B, according to an example embodiment.

Accordingly, in one example, lost packets may be minimized/eliminated by maintaining a count of copies of packets of the flow that a network node had previously obtained at a port. As shown in FIGS. 8A-8D, counts may be utilized to eliminate lost packets in this manner. FIG. 8A illustrates forwarding table 800A including active bits associated with respective forwarding ports of respective flows. Forwarding table 800A may be similar to forwarding table 500A, including flow ID column 205, forwarding port column 210, and active bit column 805.

FIG. 8B illustrates counter table 800B including counts of packets associated with respective non-forwarding ports of respective flows. Counter table 800B includes flow ID column 810, non-forwarding port column 815, and count column 820. Like Flow ID column 205, flow ID column 810 includes flows received at the network node. Non-forwarding port column 815 includes non-forwarding ports of respective flows. Count column 820 includes a count of packets received at the corresponding non-forwarding port. Briefly, when a network node receives a packet for flow ID F1 at port 2, network node does not forward the packet (since port 2 is not a forwarding port) and decreases the [F1, port 2] counter by one. When the counter reaches zero, this indicates that the route has changed such that port 2 is now the forwarding port. Accordingly, the network node may forward the packet from port 2 instead of port 1.

FIG. 8C illustrates a method 800C of preventing duplication of packets in a collection network based on forwarding table 800A and counter table 800B. Method 800C may be performed at any network node (e.g., network node 150(1)). At 822, the network node receives a packet at port p (e.g., port 160(1) or 160(2)). At 824, the network node extracts the flow ID f from the packet. At 826, the network node determines whether flow ID f is already in the forwarding table 800A. If it is determined that the flow ID f is already in the forwarding table 800A, at 828 the network node reads the forwarding port i for the flow from forwarding table 800A. At 830, the network node determines whether port p is the forwarding port i associated with flow ID f (i.e., whether the network node had previously obtained a copy of a packet of flow ID f at port p). If it is determined that the network node has not previously obtained a copy of a packet of flow ID f at port p, at 832 the network node determines whether an entry for the flow f and port p are already in the counter table 800B.

If it is determined that the flow ID f and port p are already in the counter table 800B, at 834 the network node reads the corresponding counter entry and, at 836, determines whether the counter entry is zero. If it is determined that the counter entry is not zero (e.g., greater than zero), at 838 the network node decrements the count entry in the counter table 800B by one. At 840 the network node drops the packet and, at 842, waits to receive a new packet before performing method 800C again. Returning to 836, if it is determined that the corresponding counter entry is equal to zero, at 844 the network node forwards the packet (e.g., to network node 150(3)) and, at 846, sets the active bit corresponding to the flow of the packet to "T". At 842, the network node waits to receive a new packet before performing method 800C again.

Returning to 832, if it is determined that the flow ID f and port p are not already in the counter table 800B, at 848 the network node adds flow ID f, port p, and the corresponding counter entry (set to zero) to the counter table 800B. The network node then forwards the packet at 844, sets the active bit corresponding to the flow of the packet to "T" at 846, and waits for a new packet at 842. Returning to 830, if it is determined that the network node has previously obtained a copy of a packet of flow ID f at port p, at 850 the network node increments the (one or more) counter entries corresponding to flow ID f in counter table 800B. The network node then forwards the packet at 844, sets the active bit corresponding to the flow of the packet to "T" at 846, and waits for a new packet at 842. Returning to 826, if it is determined that the flow ID f is not already in the forwarding table 800A, at 852 the network node adds flow ID f, associated forwarding port p, and corresponding active bit to the forwarding table 800A. The network node then forwards the packet at 844, sets the active bit corresponding to the flow of the packet to "T" at 846, and waits for a new packet at 842.

Since in method 800C the first packet of a flow received at a port is always forwarded, route changes that exclude the previous forwarding port in favor of new ports do not create lost packets. On the other hand, maintaining counters ensures that the same packet is not captured multiple times under normal operating conditions (e.g., when the sequence of entry points into collection network 120 by multiple packets belonging to a single flow is the same, which is the case for packets captured on production network 110 with stable routing). However, when the first packet of a flow hits several entry points to collection network 120 (e.g., a packet captured on production network 110 by multiple entry points), the first packet is transferred multiple times to collection server 130. Also, changes in the entry sequence into collection network 120 by packets of a given flow that lead to packets not hitting the forwarding port (e.g., in case of a routing change in production network 110 that excludes that entry point connected to the forwarding port) result in continuous duplication. In order to avoid such duplication, entries in forwarding table 800A and counter table 800B may be flushed periodically.

Figure 8D:
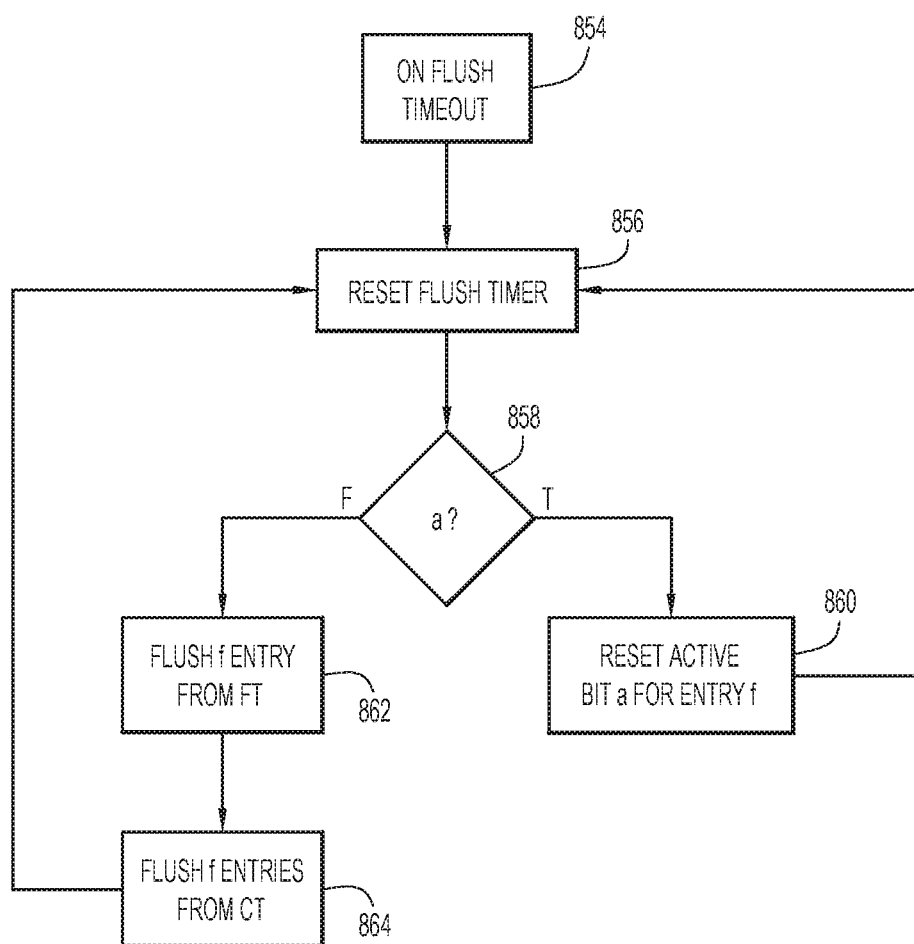
FIG. 8D illustrates a method for flushing based on the forwarding table of FIG. 8A and the counter table of FIG. 8B, according to an example embodiment.

FIG. 8D illustrates a method 800D of flushing forwarding table 800A and counter table 800B. At 854, a flush timeout occurs, and at 856, the network node resets the flush timer for each entry in forwarding table 800A. At 858, for each entry in forwarding table 800A, the network node determines whether the active bit is set to "T" or "F". If an active bit is set to "T", that active bit is reset to "F" at 860. If an active bit is set to "F", at 862 the network node flushes the corresponding entry from forwarding table 800A and, at 864, flushes the corresponding entry from counter table 800B.

The maximum number of duplicates that can be delivered to collection server 130 according to methods 800C and 800D is $C=\max\{D,Tf\} \times Rf \times (Nf-1)$, where Tf is the flush timeout, Nf is the maximum number of entry points to the production network 110 of packets of flow f (e.g., the number of entry points 190(1)-190(4) hit by flow f in the production network 110, in the case of packet capture), Rf is the maximum packet rate of flow f, and D is the maximum difference in time between the same data unit entering the collection network 120 from different entry points. For example, in the case of packet capture on production network 110, D is the maximum latency on production network 110 between entry points 190(1)-190(4).

Figure 9D:
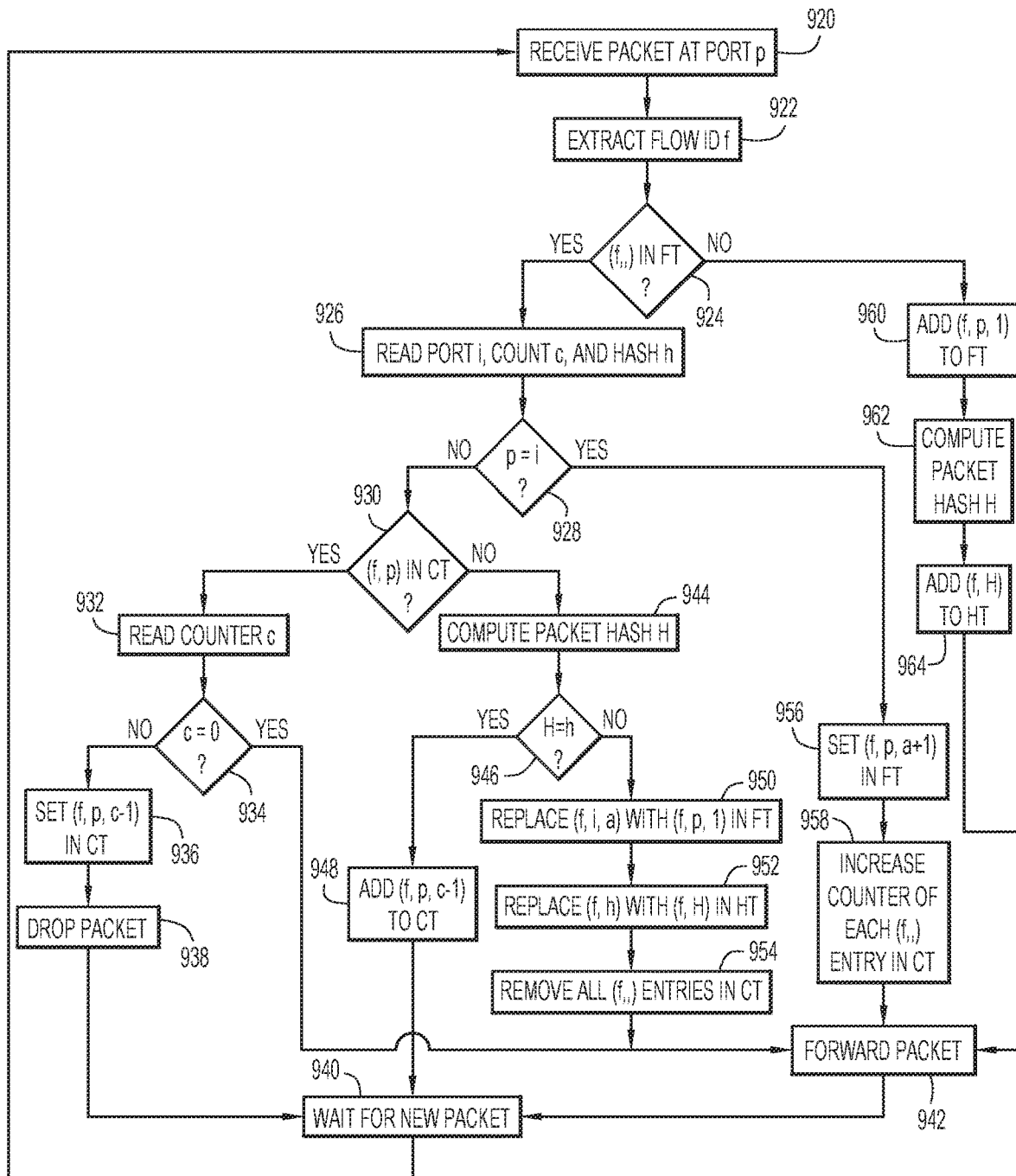
FIG. 9D illustrates a method for preventing duplication of packets in a collection network based on the forwarding table of FIG. 9A, the counter table of FIG. 9B, and the hash table of FIG. 9C, according to an example embodiment.

In order to further reduce the number of duplicates, a network node (e.g., network node 150(1)) may maintain a hash table. As shown in FIGS. 9A-9D, a hash table may be utilized to further reduce the number of duplicates in this manner. FIG. 9A illustrates forwarding table 900A including counts of packets associated with respective forwarding ports of respective flows. Forwarding table 900A may include flow ID column 205, forwarding port column 210, and count column 905. FIG. 9B illustrates counter table 900B including counts of packets associated with respective non-forwarding ports of respective flows. Counter table 900B includes flow ID column 810, non-forwarding port column 815, and count column 820.

FIG. 9C illustrates a hash table 900C including hashes of packets associated with respective flows. Hash table 900C includes flow ID column 910 and hash column 915. Briefly, a network node may compare a unique identifier of a copy of a packet of the flow with a unique identifier of another copy of a packet of the flow. Whenever a new entry is created in forwarding table 900A for flow ID f (i.e., a forwarding port is selected for a flow), a unique identifier (e.g., a hash) of the packet is computed and stored in the hash table 900C for flow ID f. Moreover, a counter may be set to one in forwarding table 900A, and may be incremented every time a packet of flow ID f is received through the forwarding port. Inactive flows may be removed periodically.

FIG. 9D illustrates a method 900D of preventing duplication of packets in collection network 120 based on forwarding table 900A, counter table 900B, and hash table 900C. Method 900D may be performed at any network node (e.g., network node 150(1)). At 920, the network node receives a packet at port p (e.g., port 160(1) or 160(2)). At 922, the network node extracts the flow ID f from the packet. At 924, the network node determines whether flow ID f is already in the forwarding table 900A. If it is determined that the flow ID f is already in the forwarding table 900A, at 926 the network node reads the corresponding forwarding port i from forwarding table 900A, count from counter table 900B, and hash from hash table 900C. At 928, the network node determines whether port p is the forwarding port i associated with flow ID f (i.e., whether the network node had previously obtained a copy of a packet of flow ID f at port p). If it is determined that the network node has not previously obtained a copy of a packet of flow ID f at port p, at 930 the network node determines whether an entry for flow ID f and port p are already in the counter table 900B.

If it is determined that the flow ID f and port p are already in the counter table 900B, at 932 the network node reads the corresponding counter entry from counter table 900B and, at 934, determines whether the counter entry is zero. If it is determined that the counter entry is not zero (e.g., greater than zero), at 936 the network node decrements the count entry in the counter table 900B by one. At 938 the network node drops the packet and, at 940, waits to receive a new packet before performing method 900D again. Returning to 934, if it is determined that the corresponding counter entry is equal to zero, at 942 the network node forwards the packet (e.g., to network node 150(3)) and, at 940, waits to receive a new packet before performing method 900D again.

Returning to 930, if it is determined that the flow ID f and port p are not already in the counter table 900B, at 944 the network node computes a hash H for the packet and, at 946, determines whether hash H is identical to hash h from hash table 900C (i.e., whether the network node has previously received a copy of the packet). If it is determined that the network node has previously received a copy of the packet, at 948 the network node decrements the count in counter table 900B by one and, at 940, waits for a new packet. If it is determined that the network node has not previously received a copy of the packet, the network node replaces the entry (f, i, a) with (f, p, 1) in forwarding table 900A (950), replaces (f, h) with (f, H) in hash table 900C (952), and removes all entries for flow ID f in counter table 900B (954). At 942, the network node forwards the packet and, at 940, waits for a new packet.

Returning to 928, if it is determined that the network node has previously obtained a copy of a packet of flow ID f at port p, at 956 the network node increments count a in the forwarding table 900A for flow ID f by one. At 958, the network node increments all entries in counter table 900B for flow ID f by one. At 942, the network node forwards the packet and, at 940, waits to receive a new packet. Returning to 924, if it is determined that the flow ID f is not already in the forwarding table 900A, at 960 the network node adds the flow ID f and port p to the forwarding table 900A with a count of one. At 962, the network node computes a hash H of the packet and, at 964, adds flow ID f and hash H to hash table 900C. At 942, the network node forwards the packet and, at 940, waits to receive a new packet.

Method 900D effectively selects, as the forwarding port, the port that first receives a packet entering collection network 120 through multiple entry points (possibly after a few changes of forwarding ports). As such, method 900D is particularly effective in reducing (possibly to zero) duplicates when the order of entry to collection network 120 across multiple entry points and routing in the collection network 120 are stable. For example, in the case of packet capture from a production network 110, method 900D is effective when routing is stable on both production network 110 and collection network 120.

However, duplicates may nonetheless be generated when a change in the entry points to the collection network 120 (e.g., a routing change in the production network 110, in the case of distributed packet capture) cause a port to receive a packet, where that port has not previously received packets. The maximum number of duplicates generated may be $C = D \times Rf$, where Rf is the maximum packet rate of flow f, and D is the maximum difference in time between the same packet entering the collection network from different entry points. For example, in the case of packet capture on production network 110, D is the maximum latency on production network 110 between entry points 190(1)-190(4).

As such, in order to fully remove duplicates, network nodes may use a hash array. In order to completely avoid duplicates, each network node maintains for each flow a list of the unique packet identifiers (e.g., hashes) of the last N data units forwarded for each flow ID f When a first packet of flow ID f is received from port i, a new entry is created in the forwarding table for the forwarding port i and the packet hash stored with that entry. As more packets are received from the forwarding port i, the hashes are appended to the list for that forwarding table entry. Once all N entries of the list are filled, the hash of a forwarded packet replaces the least recent hash. When a packet of flow ID f is received from a non-forwarding port p, the packet hash is computed and searched within the list of N identifiers associated with the flow ID f entry. If found, the packet is not forwarded because the packet had already been previously received through the forwarding port and forwarded. If the packet is not found in the list, the entry for the flow is updated with port p as the forwarding port and the packet hash is inserted in the list.

The implementation and execution complexity involved in using a hash array is much higher than, e.g., method 900D, but is nonetheless significantly lower than the conventional approaches in which a collection server stores hashes and performs a search for every received packet. In fact, using a forwarding table lowers storage requirements for the list of N stored hashes and consequently minimizes the search space for hashes. Specifically, N depends on the maximum rate of the flow f and the time difference between the entrance (ingress) of a packet into collection network 120 across all entry points 190(1)-190(4) for flow ID f. In the case of distributed packet capture, this is the maximum latency on production network 110 between any two entry points 190(1)-190(4) (assuming that the latency on the links connecting the entry points 190(1)-190(4) to ports 160(1), 160(2), 170(1), and 170(2) is constant or variable within a range that is negligible compared to the latency on production network 110).

Certain data plane chips are programmable only using the P4 programming language, which does not allow for the modification of tables when processing a packet. Instead, tables can only be modified by an external entity in the control plane, such as a software program running on a general purpose Central Processing Unit (CPU) directly connected to the chip (i.e., within the same board/system) or connected through the network itself. In the former case, the software program may be a network operating system (OS) or an application executing on top of the OS. In the latter case the software program may be a controller. Regardless, modifying table entries requires a time that is much greater than the inter-arrival time of packets, which would be problematic for duplication prevention. Specifically, packets arriving at a network node during the time interval between the arrival of the first packet of a flow and the creation of the corresponding entry in the flow table would be forwarded as packets of a new flow (i.e., as duplicates). Given the time scale of such an interval, potentially hundreds of thousands of duplicates would be generated for each flow.

Accordingly, an alternative embodiment is provided herein in which registers (rather than tables) are utilized to prevent duplication of packets. Registers are memory element arrays that are available on certain programmable data plane chips. Registers can be written to or read from while a packet is being processed with data plane operations (e.g., using P4 statements). Registers are accessed through an index (rather than a key lookup). The following description with reference to FIGS. 10A-13B prevents duplications using one or more registers.

FIG. 10A illustrates a register 1000A associating respective forwarding ports with respective flows. Register 1000A includes elements 1010(1)-1010(8). It will be appreciated that register 1000A may include any suitable number of elements (e.g., 1024). The number of bits of elements 1010(1)-1010(8) may vary between one and the maximum allowed by the hardware architecture of the network node storing register 1000A. In one example, elements 1010(1)-1010(8) may be set to one byte long using P4. Access to each element in the register 1000A may be provided by indexing the element directly (e.g., "write element 1010(5)") or through a hash function (e.g., "write element number hash (source_address, destination_address)").

As shown, register 1000A stores the forwarding port associated with flow ID f in an element (e.g., element 1010(5)) at position hash_10(ID_f), where hash_10( ) is a hash function that generates a ten-bit output (suitable to index 1024 positions) and ID_f is the set of header fields that constitute the identifier of the flow (e.g., source and destination IP addresses, transport protocol, and source and destination transport ports). A predefined port number (e.g., port zero if the ports are numbered starting from one) indicates that the entry is empty (i.e., that no packet belonging to a flow hashing to that specific element has been observed at that port. As such, register 1000A may also be referred to as Flow Port Register (FPR) 1000A.

There is a nonzero probability of two different flows hashing to the same value (i.e., "hash collision"). In this case, if the forwarding port of the second flow is different from that of the first flow, the packets of the second flow may not be forwarded and may consequently be lost (e.g., no copies of the packets of the second flow arrive at collector server 130). In order to minimize issues resulting from hash collisions, a Bloom filter may be utilized to detect, with a lower collision probability, whether a given port has previously observed a particular flow. FIG. 10B, for example, illustrates a Bloom filter 1000B. In one example, Bloom filter 1000B may comprise three registers 1020(1)-1020(3), each one bit wide. The Bloom filter may be implemented using check and set operations on registers 1020(1)-1020(3).

Figure 10C:
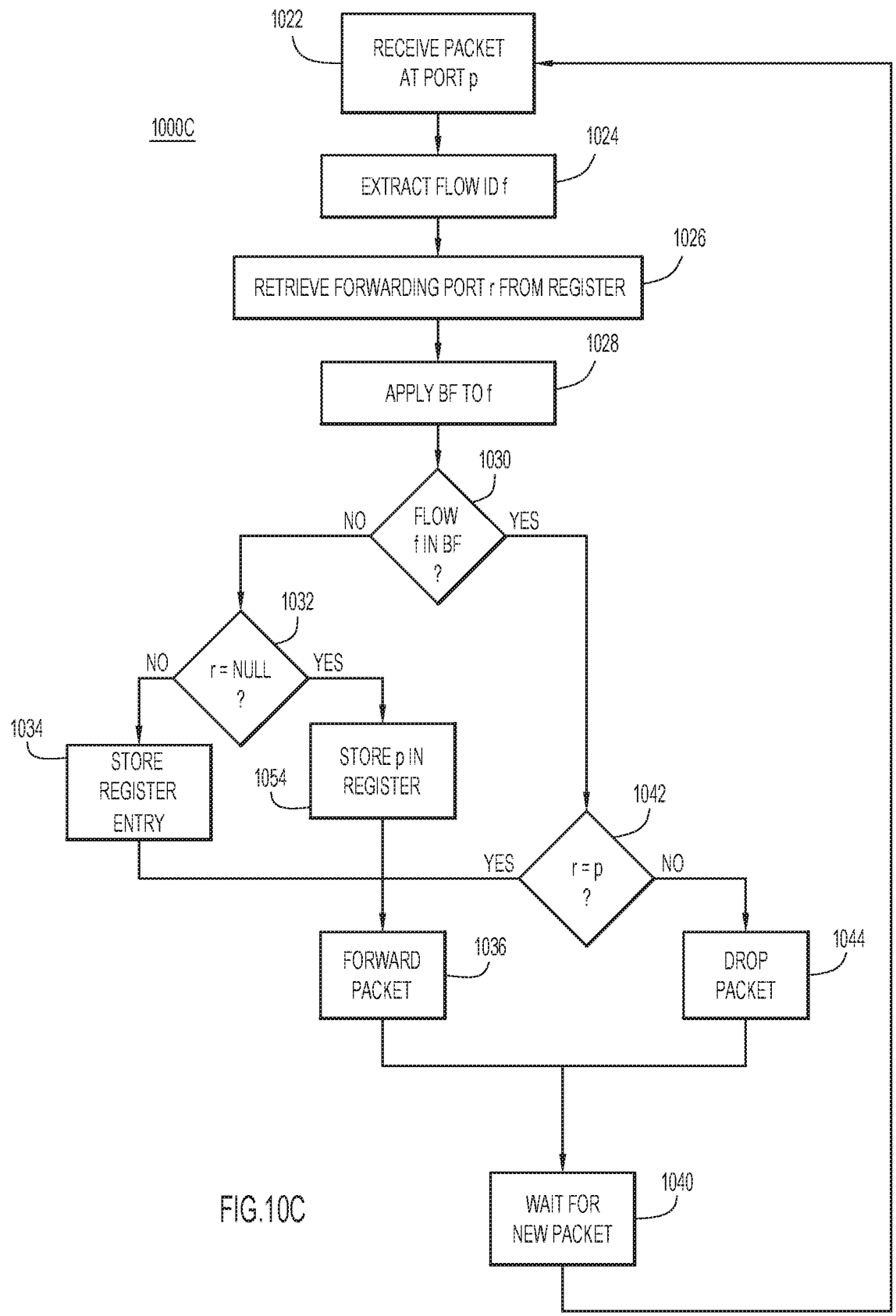
FIG. 10C illustrates a method for preventing duplication of packets in a collection network based on the register of FIG. 10A and the Bloom filter of FIG. 10B, according to an example embodiment.

FIG. 10C illustrates a method 1000C for preventing duplication of packets in a collection network based on register 1000A and Bloom filter 1000B. Method 1000C may be performed by a network node (e.g., network node 150(1)), and may enable the network node to determine whether to forward a packet. At 1022, the network node receives a packet at port p (e.g., port 160(1) or 160(2)). At 1024, the network node extracts the flow ID f from the packet. At 1026, the network node retrieves forwarding port r from register 1000A. At 1028, the network node applies the Bloom filter 1000B to flow ID f and, at 1030, determines whether the flow ID f is already in the Bloom filter 1000B (i.e., whether the network node had previously obtained a copy of a packet of the flow with flow ID f).

If it is determined that flow ID f is not already in the Bloom filter 1000B, at 1032 the network node determines whether the forwarding port r is null. If it is determined that the forwarding port r is not null, a collision is implied and at 1034 the network node resets the corresponding element in the register 1000A and, at 1036, forwards the packet. If it is determined that the forwarding port r is null, at 1038 the network node stores port p in the register 1000A and, at 1036, forwards the packet. At 1040, the network node waits to receive a new packet before performing method 1000C again.

Returning to 1030, if it is determined that the flow ID f is already in the Bloom filter 1000B, at 1042 the network node determines whether port p at which the packet was received is the forwarding port r associated with flow ID f (i.e., whether the network node had previously obtained a copy of a packet of flow ID f at port p). If it is determined that the network node had previously obtained a copy of a packet of flow ID f at port p, at 1036 the network node forwards the packet and, at 1040, waits to receive a new packet. If it is determined that the network node had previously obtained a copy of a packet of flow ID f at port p, at 1044 the network node drops the packet and, at 1040, receive a new packet. Periodically, both the registers 1000A and 1020(1)-1020(3) may be reset to address topology changes. That is, the network node may determine whether the network node has previously obtained the copy of a packet within a period of time (e.g., a predefined period of time).

Depending on the hardware architecture, resetting registers as a whole may not be possible via the data plane (e.g., using P4) because the operation is not atomic. Instead, the control plane may initiate a reset. Depending on the specific hardware architecture, this may involve iterating through each element of registers 1000A and 1020(1)-1020(3) (e.g., elements 1010(1)-1010(8)) to reset the elements one by one (e.g., by assigning a value of zero to each element). This process may requires an amount of time that is not negligible compared to packet inter-arrival time. As such, assuming registers 1020(1)-1020(3) of the Bloom filter 1000B are reset first, there is a period of time in which the Bloom filter 1000B is reset but the register 1000A is not. As a consequence, the Bloom filter 1000B labels flows that are already associated with a forwarding port as if those flows had not already been observed at the receiving port. In this case, the network node acts as if there is a flow collision and forwards packets of the flow regardless of the port at which the packet was received. This increases the number of duplicates.

Moreover, during the time required by the register 1000A to be reset, the Bloom filter 1000B registers packets of new flows as those packets are received. Accordingly, the Bloom filter 1000B may label a packet as belonging to a flow that is already associated with a forwarding port, even though the corresponding element of register 1000A (e.g., element 1010(5)) is empty. This can cause the network node to set the receiving port as the forwarding port and forward the packet, which may be a duplicate. In essence, if the time needed to reset registers 1010(1) and 1020(1)-1020(3) is long compared to the packet inter-arrival time, the Bloom filter 1000B and register 1000A become desynchronized, thereby hindering the capability of the Bloom filter 1000B to detect hash collisions on the register 1000A. If the time required to reset the registers of the Bloom filter 1000B and register 1000A is comparable to the reset interval itself, the network node maybe unable to satisfactorily perform method 1000C.

Figure 10D:
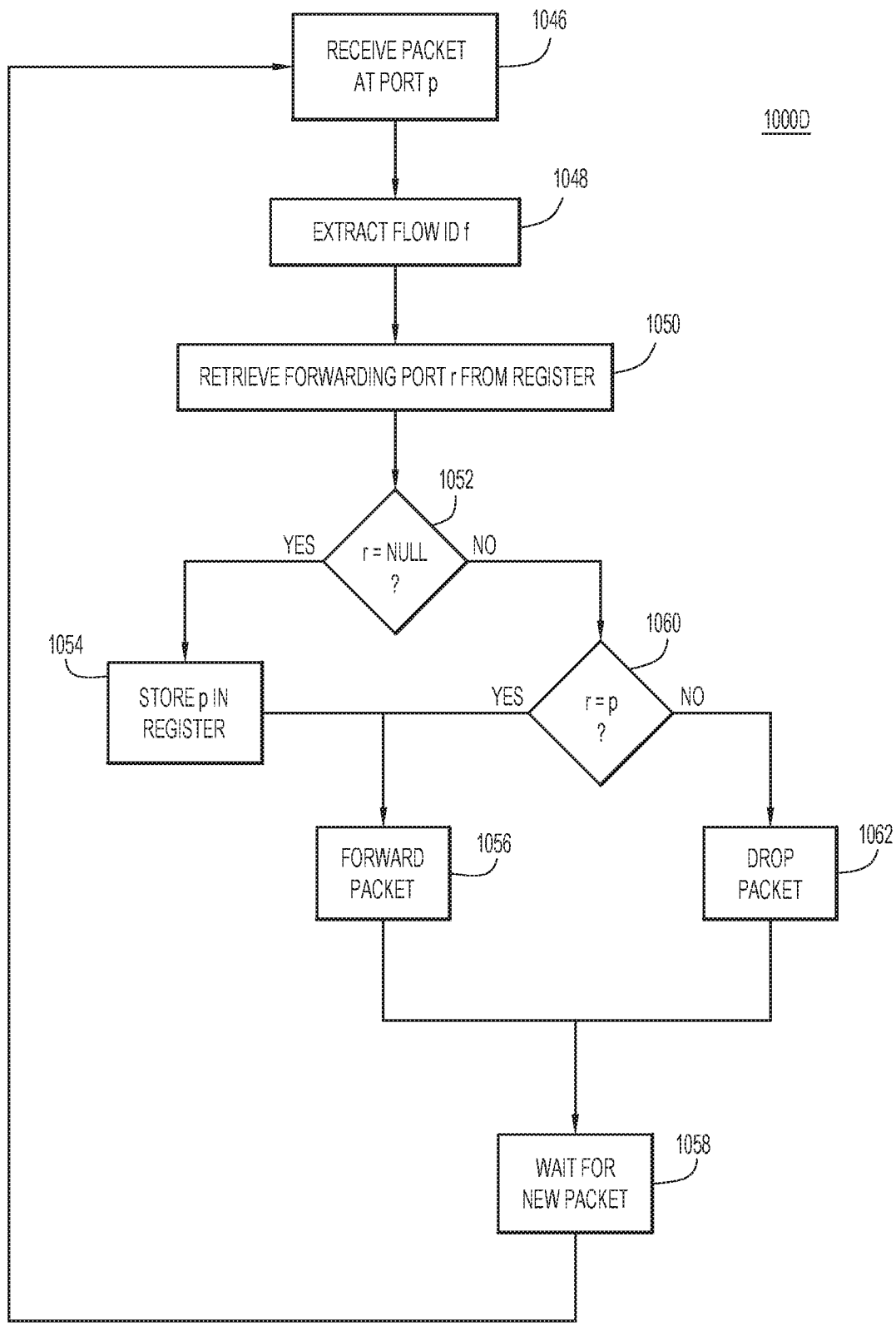
FIG. 10D illustrates a method for preventing duplication of packets in a collection network based on the register of FIG. 10A without the Bloom filter of FIG. 10B, according to an example embodiment.

Accordingly, FIG. 10D illustrates a method 1000D for preventing duplication of packets in a collection network based on register 1000A but without Bloom filter 1000B. Method 1000D may be performed by a network node (e.g., network node 150(1)). At 1046, the network node receives a packet at port p (e.g., port 160(1) or 160(2)). At 1048, the network node extracts the flow ID f from the packet. At 1050, the network node retrieves forwarding port r from register 1000A. At 1052, the network node determines whether the forwarding port r is null. If it is determined that the forwarding port r is null, at 1054 the network node stores port p in the register 1000A and, at 1056, forwards the packet. At 1058, the network node waits to receive a new packet before performing method 1000C again.

Returning to 1052, if it is determined that the forwarding port r is not null, at 1060 the network node determines whether port r is port p (i.e., whether the packet was received at the forwarding port). If it is determined that the packet was received at the forwarding port, at 1056 the network node forwards the packet and, at 1058, waits to receive a new packet before performing method 1000D again. If it is determined that the packet was not received at the forwarding port, at 1062 the network node drops the packet and, at 1058, waits to receive a new packet.

In case of a hash collision between hypothetical flows f and g, packets of flow g that are not received on the forwarding port of flow f are dropped and consequently lost. However, the hash collision probability is low in reasonable operating conditions (e.g., realistic packet and flow inter-arrival rate, hash size, etc.). Experimental results have confirmed that method 1000D results in minimal hash collisions while preventing duplicates at a higher rate than method 1000C.

Figure 11:
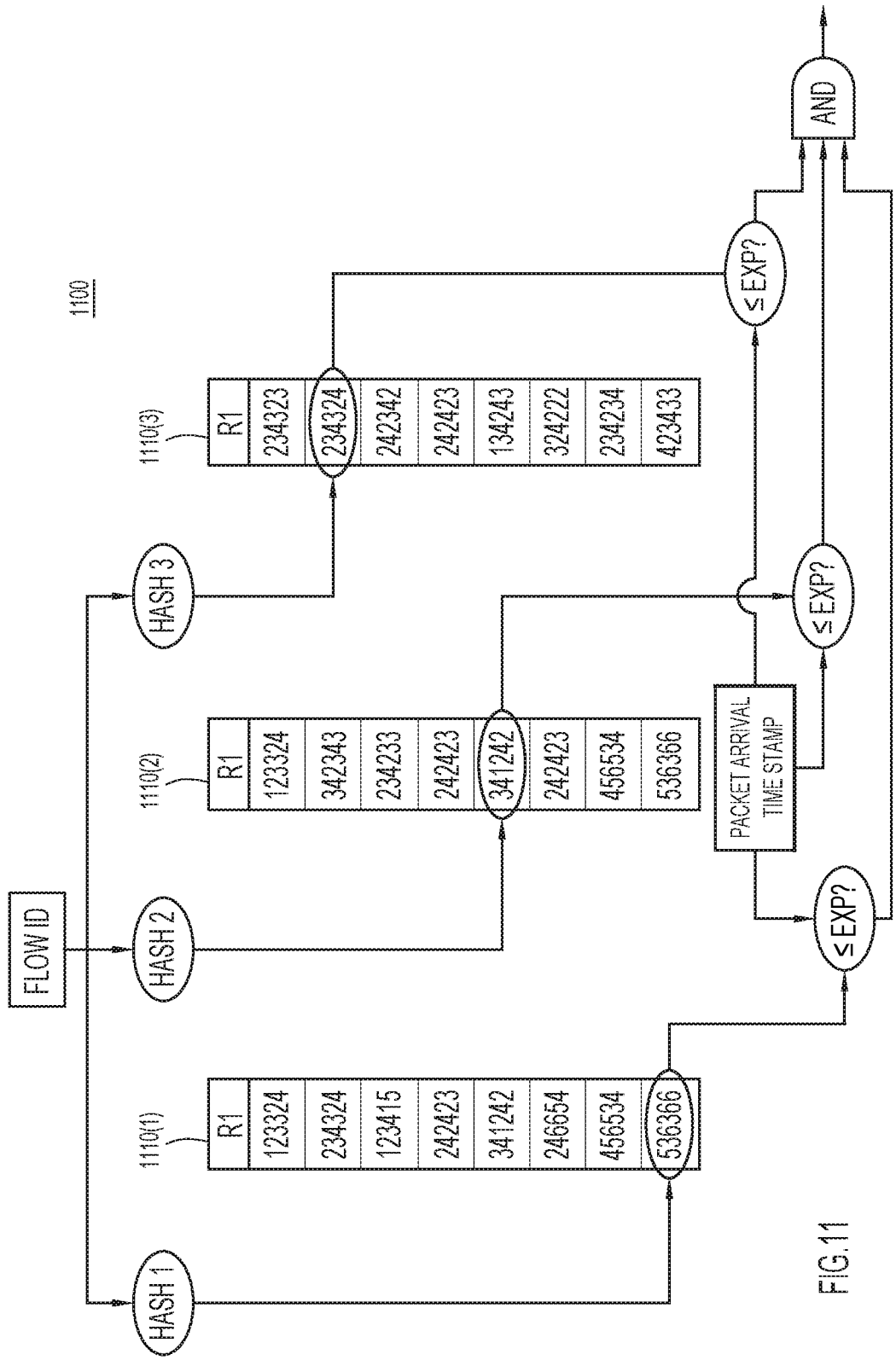
FIG. 11 illustrates a plurality of registers comprising a Bloom filter storing time stamps, according to an example embodiment.

FIG. 11 illustrates another example Bloom filter 1100. Bloom filter 1100 comprises three registers 1110(1)-1110(3) whose elements store a time stamp (rather than a bit). Using more registers to implement a Bloom filter reduces the possibility of a false positive at the expense of larger resource utilization (i.e., more register space). The Bloom filter may be implemented using check and set operations on registers 1110(1)-1110(3). The time stamps may indicate the time of the last check and set operation for a given flow and port. Briefly, when a packet arrives at the network node, the time stamp in the entry corresponding to the flow stored in the Bloom filter 1100 is compared to the packet time of arrival. Elements of the Bloom filter 1100 may be aged out instead of resetting registers 1110(1)-1110(3). In other words, the network node 150(1) may determine whether the network node 150(1) had previously obtained a copy of a packet of a flow within a period of time based on a time at which a port of network node 150(1) had previously obtained a copy of a packet of the flow.

As shown, a difference between the packet time of arrival and the timestamp may be computed. If the difference is lower than the reset time, the flow has been already observed and associated with a forwarding port. As a result, if the value in the corresponding entry of the register 1000A is different from the receiving port, the network node discards/drops the packet. The network node may compute a difference between the packet arrival time and corresponding time stamp. If the different is larger than the reset period in at least one of the registers implementing Bloom filter 1100, this indicates that the flow has not been (recently) observed at the forwarding port. In this case, the network node may forward the packet and set the receiving port as the forwarding port in the register 1000A.

Implementing Bloom filter 1100 requires a larger amount of memory than method 1000C because the elements of Bloom filter 1100 are wider than one bit. In other words, given a fixed amount of memory, the registers of Bloom filter 1100 have a limited number of entries. However, Bloom filter 1100 may not require the control plane to periodically reset the registers. Experimental results have shown that implementing Bloom filter 1100 achieves comparable performance in terms of duplication and loss rate with method 1000D.

A table may be more suitable than registers to store the forwarding port of each flow because the forwarding port may be searched based on the flow identifier without incurring issues related to the hash collisions. However, the time required for the control plane to update the table each time the network node processes the first packet from a new flow may be unacceptable for certain applications. In fact, a very large number of duplicates may be generated for the flow in that time. Hence, a combination of a register (e.g., register 1000A) and a forwarding table (e.g., forwarding table 200A) may be implemented. Briefly, when the first packet of a flow is processed, the network node may send, to the control plane, a request to add an entry containing the forwarding port. At the same time, the network node may store the forwarding port in an element of a register indexed by a hash of the flow identifier. Once the control plane has added the forwarding port of a flow to the forwarding table, the register entry corresponding to the flow may be emptied. Although there may be a non-zero probability that two different flows have a hash collision, the hash is now used only in the time required to install a new entry in the flow-port table. Hence, the time span in which a flow collision might occur may be reduced.

Figure 12:
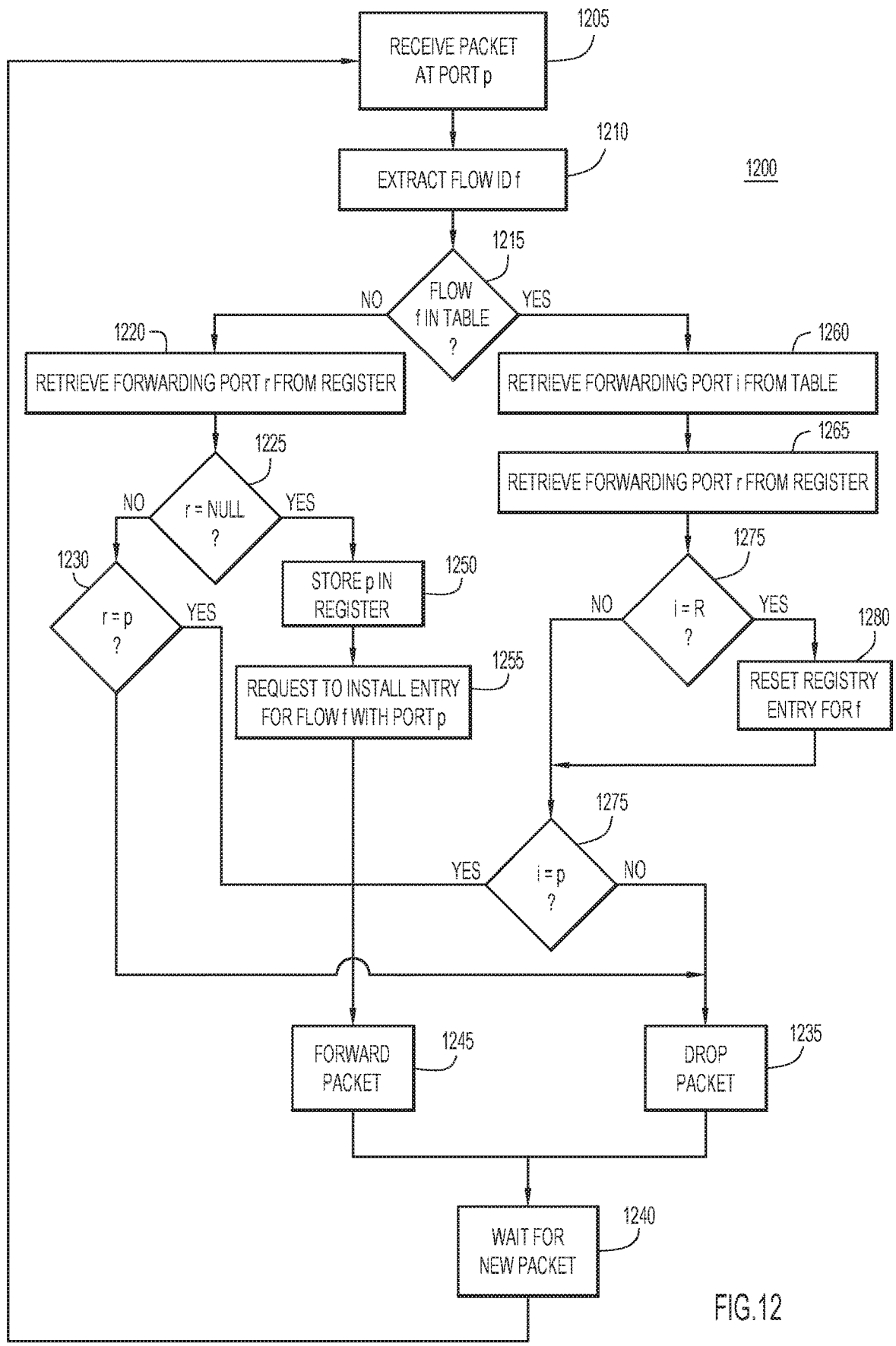
FIG. 12 illustrates a method for preventing duplication of packets in a collection network based on a forwarding table and a register, according to an example embodiment.

FIG. 12 illustrates a method 1200 of preventing duplication of packets in a collection network based on a forwarding table and (e.g., forwarding table 200A) a register (e.g., register 1000A). Method 1200 may be performed by a network node (e.g., network node 150(1)). At 1205, the network node receives a packet at port p (e.g., port 160(1) or 160(2)). At 1210, the network node extracts the flow ID f from the packet. At 1215, the network node determines whether the flow ID f is already in the forwarding table. If it is determined that the flow ID f is not already in the forwarding table, at 1220 the network node retrieves corresponding forwarding port r from the register and determines whether the forwarding port r is null. If it is determined that the forwarding port r is not null, at 1230 the network node determines whether forwarding port r is forwarding port p (i.e., whether the packet was received at forwarding port r).

If it is determined that the packet was not received at forwarding port r, at 1235 the network node drops the packet and, at 1240, waits to receive a new packet before performing method 1200 again. If it is determined that the packet was received at forwarding port r, at 1245 the network node forwards the packet and, at 1240, waits to receive a new packet. Returning to 1225, if it is determined that the forwarding port r is null, at 1250 the network node stores port p in the register and, at 1255, requests to install an entry for flow ID f with port p in the forwarding table. At 1245 the network node forwards the packet and, at 1240, waits to receive a new packet.

Returning to 1215, if it is determined that the flow ID f is already in the forwarding table, at 1260 the network node retrieves corresponding forwarding port i from the table and, at 1265, retrieves corresponding forwarding port r from the register. At 1270, the network node determines whether forwarding port i from the table matches forwarding port r from the register. If the forwarding ports do not match, the network node proceeds to 1275. If the forwarding ports do match, the network node resets the corresponding register element for flow ID f before proceeding to 1275. At 1275, the network node determines whether port p is the forwarding port i (i.e., whether the packet was received at the forwarding port stored in the forwarding table). If it is determined that the packet was received at the forwarding port stored in the forwarding table, at 1245 the network node forwards the packet and, at 1240, waits to receive a new packet. If it is determined that the packet was not received at the forwarding port stored in the forwarding table, at 1235 the network node drops the packet and, at 1240, waits to receive a new packet.

In one example, the register element may be reset by the data plane the first time an entry is found in the forwarding table for the flow to which the packet being processed belongs. However, since it may not be known when an entry in a table is hit for the first time, method 1200 involves resetting the register element corresponding to the flow every time there is a hit on the forwarding table and the forwarding port in the forwarding table is the same as the forwarding port in the register element.

If two flows with a hash collision have the same forwarding port, duplicates of packets of the second flow may be forwarded until an entry is installed in the forwarding table for both flows. As such, in a further example, the control plane may reset the element of the flow-port register corresponding to a flow immediately after having installed a new entry for that flow in the forwarding table. Although this may require extending the time window in which a hash collision might occur by the time required by the control plane to reset the register element, such time is less than half the time required for the installation of the forwarding table entry. In fact, while the former includes only the time of one communication from the control plane to the data plane, the latter additionally includes the time required by both the notification from the data plane to reach the control plane and the control plane to react to that notification.

Certain examples described herein may use the expiration of forwarding port entries (whether in a register or in a table) to react to topology changes. Consequently, if the route of a flow changes (e.g., due to a change in the network topology) to exclude the entry point connected to the forwarding port, packets may be lost until the forwarding port information expires. However, certain scenarios tolerate zero packet loss. As such, in one example, packet loss may be avoided by using counters to track the number of packets received from the forwarding port as well as any other port through which packets for the same flow are received (i.e., any non-forwarding ports). In other words, a network node maintains a count of copies of packets of a flow that the network node had previously obtained at the port.

Figure 13A:
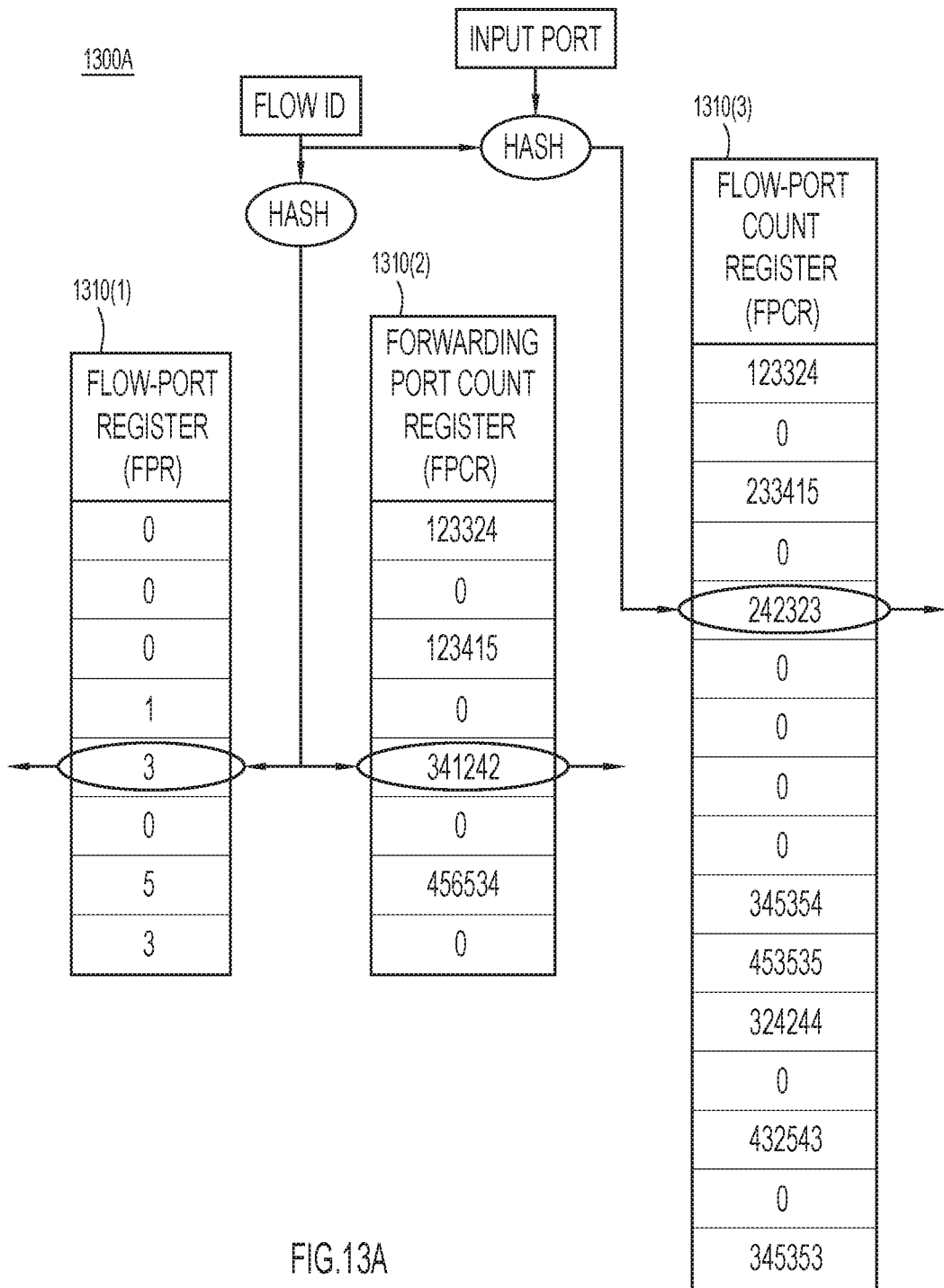
FIG. 13A illustrates a plurality of registers including counts of packets received at forwarding ports and non-forwarding ports, according to an example embodiment.

FIG. 13A illustrates a plurality of registers 1300A including registers 1310(1)-1310(3). Register 1310(1) may be similar to register 1000A, and may also be referred to as Flow Port Register (FPR) 1300(1). Register 1310(2) may include counters of packets forwarded through the forwarding port, and as such may also be referred to herein as Forwarding Port Count Register (FPCR) 1300(2). Register 1310(3) may include counters of packets forwarded through non-forwarding ports, and as such may also be referred to herein as Flow-Port Count Register (FCR) 1310(3). Thus, the plurality of registers 1300A may include counts of packets received at forwarding ports and non-forwarding ports for a given flow.

Briefly, when a packet is received at a forwarding port, the network node may increment (e.g., increase by one) the entry corresponding to the flow in register 1310(2). When a packet is received at a non-forwarding port for the first time, the counter in register 1310(3) corresponding to that port may be initialized to the current value in the register 1310(2). If packets from the flow have already been received from the port, the counter in register 1310(2) associated with the flow and the port may be compared with the corresponding counter in register 1310(3) associated to the forwarding port of the flow. If the former is larger, the packet may have reached the non-forwarding port before/without hitting the forwarding port. In this case, since the packet may not be a duplicate, the network node may forward the packet.

Figure 13B:
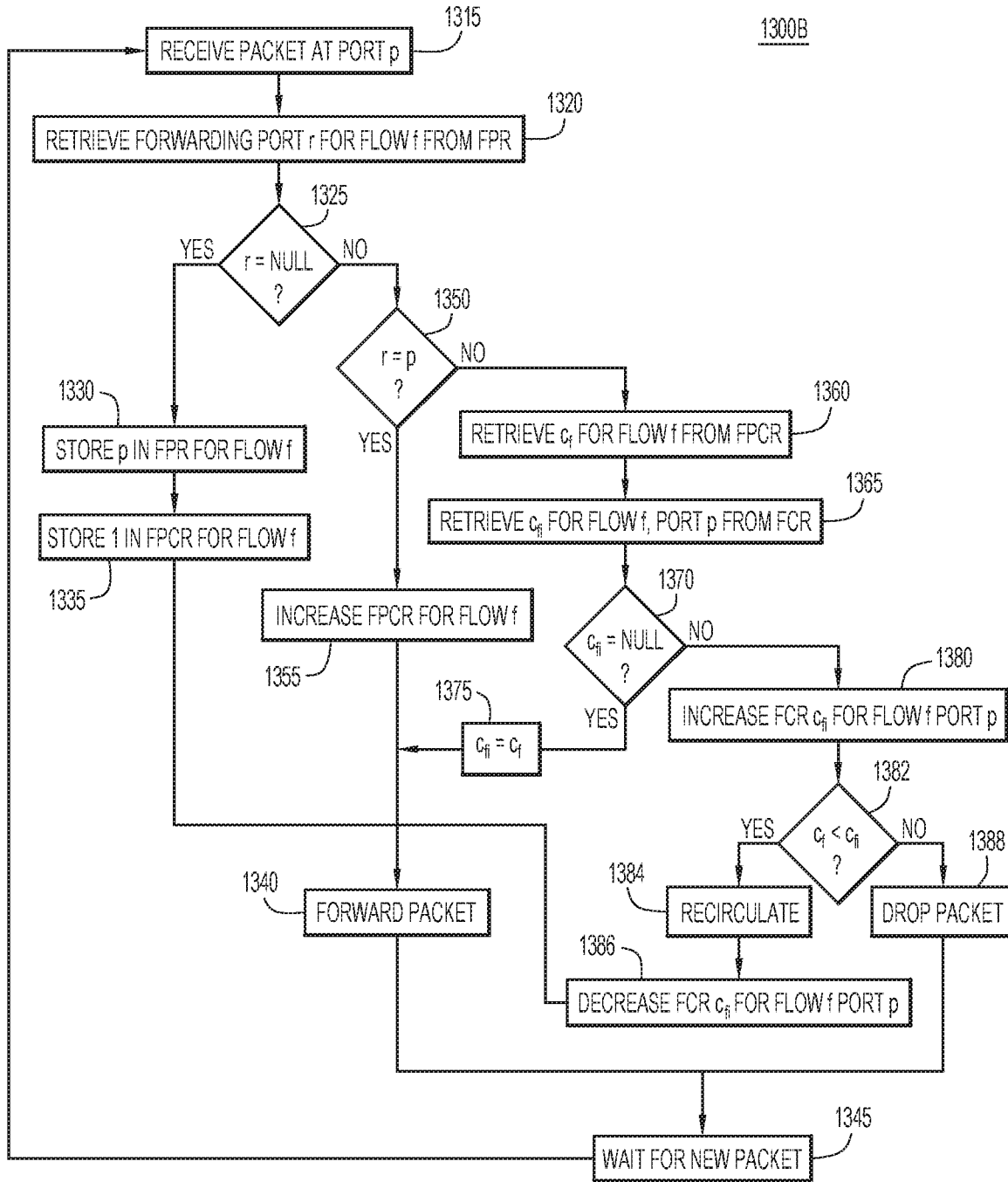
FIG. 13B illustrates a method for preventing duplication of packets in a collection network based on the plurality of registers of FIG. 13A, according to an example embodiment.

FIG. 13B illustrates a method 1300B of preventing duplication of packets in a collection network based on the plurality of registers 1300A. Method 1300B may be performed by a network node (e.g., network node 150(1)). At 1315, the network node receives a packet at port p (e.g., port 160(1) or 160(2)). At 1320, the network node retrieves the forwarding port r for flow ID f from register 1310(1). At 1325, the network node determines whether the forwarding port r is null. If it is determined that the forwarding port r is null, at 1330 the network node stores port p in register 1310(1) and, at 1335, stores "1" in register 1310(2). At 1340 the network node forwards the packet and, at 1345, waits to receive a new packet before starting method 1300B again.

Returning to 1325, if it is determined that the forwarding port r is not null, at 1350 the network node determines whether forwarding port r is forwarding port p (i.e., whether the packet was received at forwarding port r). If it is determined that the packet was received at forwarding port r, at 1355 the network node increases the corresponding count in register 1310(2) for flow ID f, at 1340 forwards the packet, and at 1345 waits to receive a new packet. If it is determined that the packet was not received at forwarding port r, at 1360 the network node retrieves count $C_f$ for flow ID f from register 1310(2), and at 1365 retrieves count $C_{fi}$ for flow ID f from register 1310(3).

At 1370, the network node determines whether count $C_{fi}$ is null. If it is determined that count $C_{fi}$ is null, at 1375 the network node determines that count $C_{fi}$ is equal to count $C_f$, at 1340 forwards the packet, and at 1345 waits to receive a new packet. If it is determined that count $C_{fi}$ is not null, at 1380 the network node increases count $C_{fi}$ corresponding to flow ID f and port p and, at 1382, determines whether count $C_f$ is less than count $C_{fi}$. If it is determined that count $C_f$ is less than count $C_{fi}$, at 1384 the network node recirculates the packet (e.g., sends the packet back to the input of the network node to start a new cycle of processing). This may enable, at 1386, decreasing count $C_{fi}$ corresponding to flow ID f and port p. At 1340, the network node forwards the packet and, at 1345, waits to receive a new packet. If it is determined that count $C_f$ is not less than count $C_{fi}$, at 1388 the network node drops the packet and, at 1345, waits to receive a new packet.

Certain hardware data plane designs (e.g., fixed function ASIC designs, P4 programmable architectures, etc.) do not allow to access the same register twice in the context of processing a packet. For this reason, in order to decrease count $C_{fi}$ at 1386 after having increased at 1380, a new processing cycle may be initiated by sending the packet back to the input as if the packet were just received. In a data plane design that allows accessing the same register multiple times in the context of the processing of the packet, recirculation at 1384 may be skipped.

Figure 14:
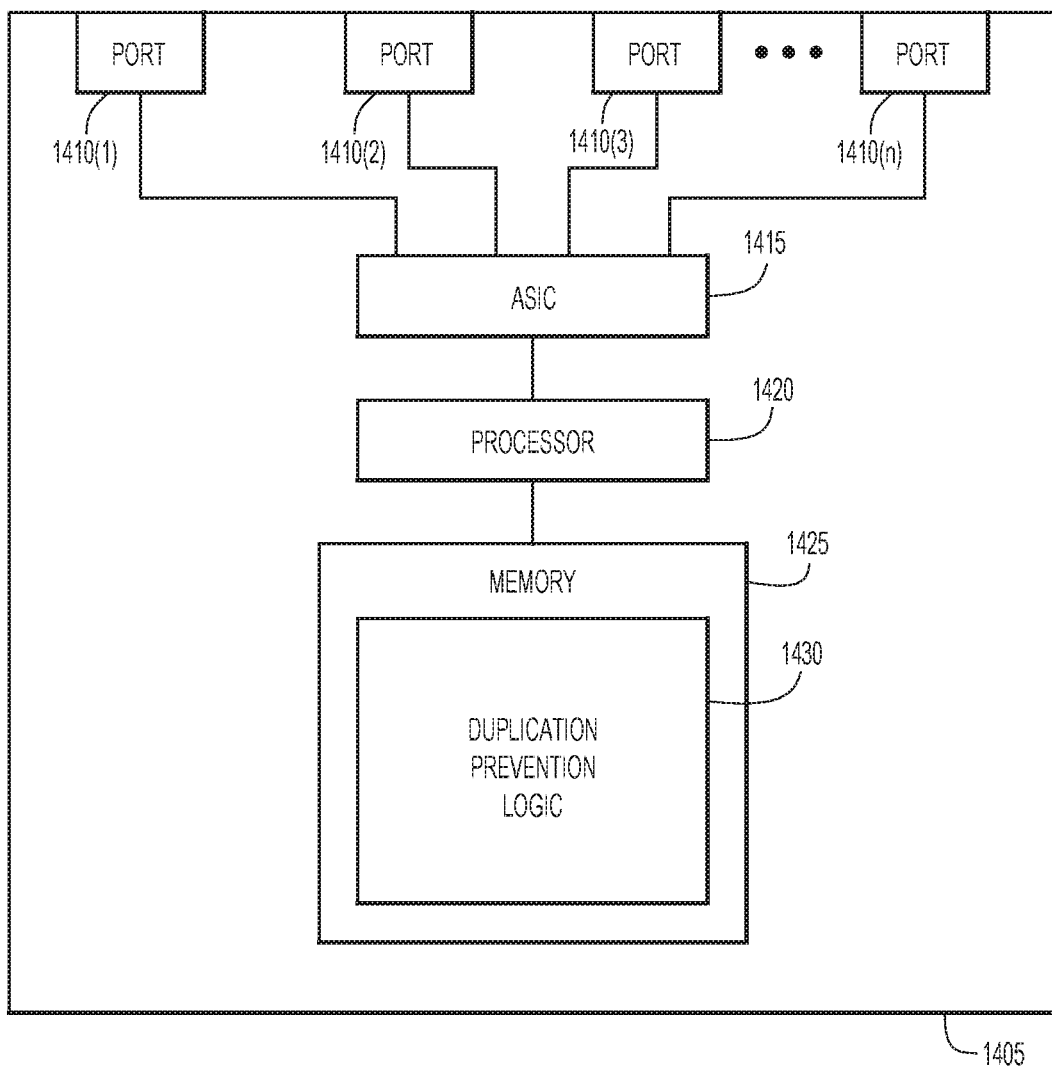
FIG. 14 is a block diagram of a network node configured to prevent duplication of packets in a collection network, according to an example embodiment.

FIG. 14 is a block diagram of a network node 1405 (e.g., network nodes 150(1)-150(3) in FIG. 1) that is configured to implement the techniques presented herein. The network node 1405 includes a network interface in the form of a plurality of network ports 1410(1)-1410(N) that enable communications over a network, an ASIC 1415 that performs network processing functions, one or more processors 1420 (e.g., microprocessors or microcontrollers), and a memory 1425. The memory 1425 includes duplication prevention logic 1430 (e.g., duplication prevention logic 195 (1)-195(3) in FIG. 1). The memory may further include one or more tables and/or registers described herein.

The memory 1425 may include read only memory (ROM), random access memory (RAM), magnetic disk storage media devices, optical storage media devices, flash memory devices, electrical, optical, or other physical/tangible memory storage devices. Thus, in general, the memory 1425 may comprise one or more tangible (non-transitory) computer readable storage media (e.g., a memory device) encoded with software comprising computer executable instructions and when the software is executed (e.g., by the one or more processors 1420) it is operable to perform the operations described herein with reference to duplication prevention. In particular, as noted, the memory 1425 includes duplication prevention logic 1430 that, when executed, enables the network node 1405 to perform duplication prevention operations described herein.

Figure 15:
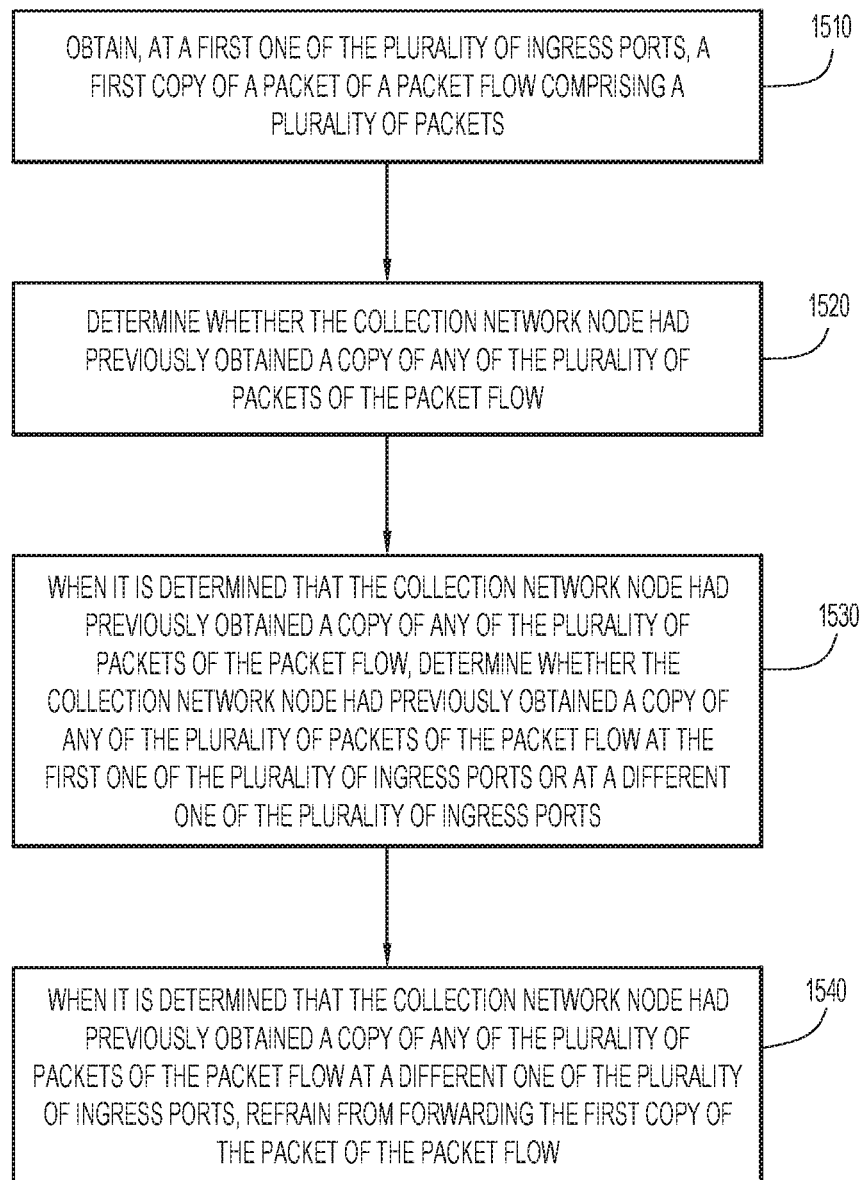
FIG. 15 illustrates a generalized method for preventing duplication of packets in a collection network, according to an example embodiment.

FIG. 15 is a flowchart of an example method 1500 for preventing duplication of packets in a collection network. Method 1500 may occur at a collection network node comprising a plurality of ingress ports (e.g., network nodes 150(1)-150(3)). At 1510, the collection network node obtains, at a first one of the plurality of ingress ports, a first copy of a packet of a packet flow comprising a plurality of packets. At 1520, the collection network node determines whether the collection network node had previously obtained a copy of any of the plurality of packets of the packet flow. At 1530, when it is determined that the collection network node had previously obtained a copy of any of the plurality of packets of the packet flow, the collection network node determines whether the collection network node had previously obtained a copy of any of the plurality of packets of the packet flow at the first one of the plurality of ingress ports or at a different one of the plurality of ingress ports. At 1540, when it is determined that the collection network node had previously obtained a copy of any of the plurality of packets of the packet flow at a different one of the plurality of ingress ports, the collection network node refrains from forwarding the first copy of the packet of the packet flow.

The problem of packet duplication also exists in other environments, such as conventional Internet of Things (IoT) infrastructures in which IoT devices are connected through multiple gateways/brokers (e.g., for reliability or coverage purposes). The gateways send multiple copies of data units/packets (e.g., measurements or samples) to collectors/subscribers. In this case, duplication prevention logic may be implemented in the gateways. Different types of flow may be defined for IoT networks. In one example, all measurements originating from the same sensor may be considered to be part of the same flow. In another example, all measurements of the same type (e.g., temperature) originating from the same sensor may be considered to be part of the same flow.

Packets can also be lost in an IoT environment, for example, when packets stop entering the collection network through the entry point that caused the packets to reach the network node via the forwarding port. In this case, packets may not be forwarded by the network node, even though the packets may be received through a different port (e.g., arriving from a different entry point). In the IoT context, because the same packet enters the network through multiple ingress points (e.g., collection network nodes connected to multiple gateways connected to the same IoT devices), multiple copies of the same packet may be delivered to the collector as duplicates.

Thus, a low complexity mechanism is described herein to prevent (e.g., reduce/eliminate) duplicates in a collection network. One example of a collection network is a NDB network transferring packets captured via SPAN and TAPs on a production network. Another example of a collection network is an IoT infrastructure receiving data from sensors and distributing the data, for instance, to a data center for big data processing. Still another example of a collection network is a set of NetFlow collectors receiving NetFlow records from production network devices.

Duplication prevention may be collectively performed by network nodes (as opposed to a single node, such as a collection server, as is done conventionally). Data received from a single input port may be assumed to not include duplicates (as is the case at the ingress of a data collection network). This ensures that data exiting the output ports of a network node also contain no duplicates (or a limited number of packets). Techniques described herein also avoid losing packets because the packets are not delivered as if the packets were duplicates. Duplication prevention may be based on each node maintaining per-flow information (e.g., the port from which a flow is being received, a count of the data units of a flow that have been forwarded, flags recording conditions or actions taken, the hash of a data unit, etc.) and deciding whether to forward or drop a packet based on such information. This may involve tracking flow level information that is used to determine whether a data unit/packet should be forwarded or dropped, thereby causing most data units to be delivered exactly once to a collector/receiver at the edge of the network.

In one form, a method is provided. The method comprises: at a collection network node comprising a plurality of ingress ports: obtaining, at a first one of the plurality of ingress ports, a first copy of a packet of a packet flow comprising a plurality of packets; determining whether the collection network node had previously obtained a copy of any of the plurality of packets of the packet flow; when it is determined that the collection network node had previously obtained a copy of any of the plurality of packets of the packet flow, determining whether the collection network node had previously obtained a copy of any of the plurality of packets of the packet flow at the first one of the plurality of ingress ports or at a different one of the plurality of ingress ports; and when it is determined that the collection network node had previously obtained a copy of any of the plurality of packets of the packet flow at a different one of the plurality of ingress ports, refraining from forwarding the first copy of the packet of the packet flow.

In another form, an apparatus is provided. The apparatus comprises: a network interface including a plurality of ingress ports; and one or more processors coupled to the network interface, wherein the one or more processors are configured to: obtain, at a first one of the plurality of ingress ports, a first copy of a packet of a packet flow comprising a plurality of packets; determine whether the apparatus had previously obtained a copy of any of the plurality of packets of the packet flow; when it is determined that the apparatus had previously obtained a copy of any of the plurality of packets of the packet flow, determine whether the apparatus had previously obtained a copy of any of the plurality of packets of the packet flow at the first one of the plurality of ingress ports or at a different one of the plurality of ingress ports; and when it is determined that the apparatus had previously obtained a copy of any of the plurality of packets of the packet flow at a different one of the plurality of ingress ports, refrain from forwarding the first copy of the packet of the packet flow.

In another form, one or more non-transitory computer readable storage media are provided. The non-transitory computer readable storage media are encoded with instructions that, when executed by a processor of a collection network node comprising a plurality of ingress ports, cause the processor to: obtain, at a first one of the plurality of ingress ports, a first copy of a packet of a packet flow comprising a plurality of packets; determine whether the collection network node had previously obtained a copy of any of the plurality of packets of the packet flow; when it is determined that the collection network node had previously obtained a copy of any of the plurality of packets of the packet flow, determine whether the collection network node had previously obtained a copy of any of the plurality of packets of the packet flow at the first one of the plurality of ingress ports or at a different one of the plurality of ingress ports; and when it is determined that the collection network node had previously obtained a copy of any of the plurality of packets of the packet flow at a different one of the plurality of ingress ports, refrain from forwarding the first copy of the packet of the packet flow.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   determining whether any ingress port of a network node is designated as a forwarding port for a packet flow;
   when it is determined that any ingress port of the network node is designated as the forwarding port for the packet flow, determining whether a first ingress port of the network node at which a packet of the packet flow is obtained is designated as the forwarding port for the packet flow; and when it is determined that the first ingress port is not designated as the forwarding port for the packet flow, refraining from forwarding the packet of the packet flow.

2. The method of claim 1, further comprising:
when it is determined that the first ingress port is designated as the forwarding port for the packet flow, forwarding the packet of the packet flow.

3. The method of claim 1, further comprising:
when it is determined that any ingress port of the network node is not designated as the forwarding port for the packet flow:
designating the first ingress port as the forwarding port for the packet flow; and
forwarding the packet of the packet flow.

4. The method of claim 1, wherein determining whether any ingress port of the network node is designated as the forwarding port for the packet flow includes determining whether any ingress port of the network node is designated as the forwarding port for the packet flow within a period of time before the packet of the packet flow is obtained at the first ingress port.

5. The method of claim 4, wherein the period of time is set based on a time at which the first ingress port had previously obtained another packet of the packet flow.

6. The method of claim 1, wherein determining whether the first ingress port is designated as the forwarding port for the packet flow includes maintaining a count of any packets of the packet flow that the first ingress port had previously obtained.

7. The method of claim 1, wherein determining whether the first ingress port is designated as the forwarding port for the packet flow includes determining whether the first ingress port is designated as the forwarding port based on a unique identifier of the packet of the packet flow.

8. The method of claim 1, wherein:
determining whether any ingress port of the network node is designated as the forwarding port for the packet flow includes determining whether an indication of the packet flow is stored in a table; and
determining whether the first ingress port is designated as the forwarding port for the packet flow includes determining whether the table associates the packet flow with the first ingress port.

9. The method of claim 1, wherein:
determining whether any ingress port of the network node is designated as the forwarding port for the packet flow includes determining whether an indication of the packet flow is stored in a register; and
determining whether the first ingress port is designated as the forwarding port includes determining whether the register associates the packet flow with the first ingress port.

10. An apparatus comprising:
a network interface; and
one or more processors coupled to the network interface, wherein the one or more processors are configured to:
determine whether any ingress port of the apparatus is designated as a forwarding port for a packet flow;
when it is determined that any ingress port of the apparatus is designated as the forwarding port for the packet flow, determine whether a first ingress port of the apparatus at which a packet of the packet flow is obtained is designated as the forwarding port for the packet flow; and
when it is determined that the first ingress port is not designated as the forwarding port for the packet flow, refrain from forwarding the packet of the packet flow.

11. The apparatus of claim 10, wherein the one or more processors are further configured to:
when it is determined that the first ingress port is designated as the forwarding port for the packet flow, forward the packet of the packet flow.

12. The apparatus of claim 10, wherein the one or more processors are further configured to:
when it is determined that any ingress port of the apparatus is not designated as the forwarding port for the packet flow:
designate the first ingress port as the forwarding port for the packet flow; and
forward the packet of the packet flow.

13. The apparatus of claim 10, wherein the one or more processors are further configured to:
determine whether any ingress port of the apparatus is designated as the forwarding port for the packet flow within a period of time before the packet of the packet flow is obtained at the first ingress port.

14. The apparatus of claim 13, wherein the period of time is set based on a time at which the first ingress port had previously obtained another packet of the packet flow.

15. The apparatus of claim 10, wherein the one or more processors are configured to:
determine whether the first ingress port is designated as the forwarding port for the packet flow by maintaining a count of any packets of the packet flow that the first ingress port had previously obtained.

16. The apparatus of claim 10, wherein the one or more processors are configured to:
determine whether the first ingress port is designated as the forwarding port for the packet flow based on a unique identifier of the packet of the packet flow.

17. One or more non-transitory computer readable storage media encoded with instructions that, when executed by a processor, cause the processor to:
determine whether any ingress port of a network node is designated as a forwarding port for a packet flow;
when it is determined that any ingress port of the network node is designated as the forwarding port for the packet flow, determine whether a first ingress port of the network node at which a packet of the packet flow is obtained is designated as the forwarding port for the packet flow; and
when it is determined that the first ingress port is not designated as the forwarding port for the packet flow, refrain from forwarding the packet of the packet flow.

18. The one or more non-transitory computer readable storage media of claim 17, wherein the instructions further cause the processor to:
when it is determined that the first ingress port is designated as the forwarding port for the packet flow, forward the packet of the packet flow.

19. The one or more non-transitory computer readable storage media of claim 17, wherein the instructions further cause the processor to:
when it is determined that any ingress port of the network node is not designated as the forwarding port for the packet flow:
designate the first ingress port as the forwarding port for the packet flow; and
forward the packet of the packet flow.

20. The one or more non-transitory computer readable storage media of claim 17, wherein the instructions further cause the processor to:

determine whether any ingress port of the network node is designated as the forwarding port for the packet flow within a period of time before the packet of the packet flow is obtained at the first ingress port.

\* \* \* \* \*